(12) United States Patent
Shiono et al.

(10) Patent No.: US 12,422,602 B2
(45) Date of Patent: Sep. 23, 2025

(54) OPTICAL FILTER

(71) Applicant: AGC Inc., Tokyo (JP)

(72) Inventors: Kazuhiko Shiono, Fukushima (JP);
Takuro Shimada, Fukushima (JP);
Yuichiro Orita, Fukushima (JP);
Nanako Nishimoto, Fukushima (JP);
Takashi Nagata, Shizuoka (JP)

(73) Assignee: AGC Inc., Tokyo (JP)

( * ) Notice: Subject to any disclaimer, the term of this patent is extended or adjusted under 35 U.S.C. 154(b) by 377 days.

(21) Appl. No.: 18/303,668

(22) Filed: Apr. 20, 2023

(65) Prior Publication Data

US 2023/0258853 A1 Aug. 17, 2023

Related U.S. Application Data

(63) Continuation of application No. PCT/JP2021/038464, filed on Oct. 18, 2021.

(30) Foreign Application Priority Data

Oct. 21, 2020 (JP) .................................. 2020-176883

(51) Int. Cl.
*G02B 5/20* (2006.01)
*G02B 5/22* (2006.01)

(52) U.S. Cl.
CPC .............. *G02B 5/208* (2013.01); *G02B 5/223* (2013.01); *G02B 5/226* (2013.01)

(58) Field of Classification Search
CPC ........ G02B 5/208; G02B 5/223; G02B 5/226; G02B 5/20; G02B 5/22; G02B 5/26; G02B 5/28; C09B 67/006; C09B 67/20
See application file for complete search history.

(56) References Cited

U.S. PATENT DOCUMENTS

| 2005/0180010 A1* | 8/2005 | Mukaiyama | H10F 39/806 |
| | | | 359/581 |
| 2009/0050946 A1* | 2/2009 | Duparre | H04N 23/55 |
| | | | 438/70 |
| 2010/0025789 A1* | 2/2010 | Imai | H10F 39/805 |
| | | | 257/E31.127 |
| 2013/0094075 A1* | 4/2013 | Saitoh | G02B 5/0833 |
| | | | 359/350 |
| 2014/0091419 A1* | 4/2014 | Hasegawa | G02B 13/005 |
| | | | 359/359 |

(Continued)

FOREIGN PATENT DOCUMENTS

| JP | 2019-49586 A | 3/2019 |
| WO | WO 2016/043166 A1 | 3/2016 |
| WO | WO 2018/043564 A1 | 3/2018 |

OTHER PUBLICATIONS

International Search Report issued Dec. 21, 2021 in PCT/JP2021/038464 filed Oct. 18, 2021, 2 pages.

*Primary Examiner* — Balram T Parbadia
(74) *Attorney, Agent, or Firm* — Oblon, McClelland, Maier &Neustadt, L.L.P.

(57) ABSTRACT

An optical filter including: a substrate; and a dielectric multilayer film laid on or above at least one major surface of the substrate as an outermost layer, in which the substrate includes a resin film including a dye (IR) and a resin, the dye (IR) has a maximum absorption wavelength in a wavelength of 680 to 800 nm in the resin, and the optical filter satisfies specific spectroscopic characteristics.

13 Claims, 4 Drawing Sheets

(56) References Cited

U.S. PATENT DOCUMENTS

| | | | |
|---|---|---|---|
| 2015/0260888 A1* | 9/2015 | Yoshihara | H10F 77/337 |
| | | | 359/359 |
| 2017/0017023 A1* | 1/2017 | Sugiyama | H10F 39/806 |
| 2017/0184765 A1 | 6/2017 | Shiono et al. | |
| 2017/0192144 A1* | 7/2017 | Ooi | G02B 5/223 |
| 2019/0227208 A1 | 7/2019 | Shiono et al. | |

* cited by examiner

OPTICAL FILTER

CROSS-REFERENCE TO RELATED APPLICATIONS

This is a bypass continuation of International Patent Application No. PCT/JP2021/038464, filed on Oct. 18, 2021, which claims priority to Japanese Patent Application No. 2020-176883, filed on Oct. 21, 2020. The contents of these applications are hereby incorporated by reference in their entireties.

TECHNICAL FIELD

The present invention relates to an optical filter that transmits light in a visible wavelength range and blocks light in a near-infrared wavelength range.

BACKGROUND ART

To obtain a clear image by reproducing a color satisfactorily, an optical filter that transmits light in a visible wavelength range (hereinafter also referred to as "visible light") and blocks light in an ultraviolet wavelength range (hereinafter also referred to as "ultraviolet light") and light in a near-infrared wavelength range (hereinafter also referred to as "near-infrared light") is used in imaging apparatus that include a solid-state imaging device.

Various types of such an optical filter are available; for example, a reflection type filter in which dielectric thin films having different refractive indices are laid alternately on one or both major surfaces of a transparent substrate to form a dielectric multilayer film. This optical filter reflects light to block utilizing light interference.

In such optical filters including a dielectric multilayer film, the optical thickness of the dielectric multilayer film varies depending on the incident angle of light. This results in various problems such as incident angle-dependent variation of a spectral transmittance curve, a light passage problem that near-infrared light that should be given a high reflectance at large incident angles is increased in transmittance, and occurrence of noise by near-infrared light reflected by the dielectric multilayer film. Use of such filters may cause a problem that the spectral sensitivity of a solid-state imaging device is affected by the incident angle. In particular, because of a recent trend of height reduction of camera modules, it is expected that optical filters will be used more frequently under a large incident angle condition.

Incidentally, the sensitivity of image sensors that are incorporated in imaging apparatus is highest around 700 to 850 nm. Thus, optical filters are required that can block light in such a near-infrared range even at large incident angles with causing almost no influence on the visible light transmittance.

Patent document 1 discloses, as an optical filter capable of attaining both of color shading suppression and ghost suppression for a camera image at high levels, an optical filter that employs a substrate having a sufficiently strong absorption band around a wavelength of 700 nm and a broad absorption band in a near-infrared wavelength of 900 nm or longer.

Patent document 1: WO2018/043564

However, the optical filter disclosed in Patent document 1 is low in the transparency in a visible range because it includes a near-infrared light absorbing dye having a maximum absorption wavelength in a wavelength of 800 nm or longer.

SUMMARY OF THE INVENTION

An object of the present invention is therefore to provide an optical filter that exhibits high transparency for visible light and high blocking ability for near-infrared light of 700 nm or longer and is suppressed in the reduction of the ability to block near-infrared light of 700 nm or longer at large incident angles.

The present invention provides an optical filter having the following configuration.

[1] An optical filter including:
a substrate; and
a dielectric multilayer film laid on or above at least one major surface of the substrate as an outermost layer, wherein
the substrate includes a resin film including a dye (IR) and a resin,
the dye (IR) has a maximum absorption wavelength in a wavelength of 680 to 800 nm in the resin, and
the optical filter satisfies all of the following spectroscopic characteristics (i-1) to (i-23):
spectroscopic characteristics (i-1) to (i-9) in a spectral transmittance curve at an incident angle of 0°:
  (i-1) an average transmittance $T_{440\text{-}490(0deg)AVE}$ in a wavelength of 440 to 490 nm is 85% or higher;
  (i-2) an average transmittance $T_{490\text{-}560(0deg)AVE}$ in a wavelength of 490 to 560 nm is 90% or higher;
  (i-3) an average transmittance $T_{560\text{-}590(0deg)AVE}$ in a wavelength of 560 to 590 nm is 83% or higher;
  (i-4) a wavelength $IR50_{(0deg)}$ at which a transmittance is 50% is in a wavelength of 600 to 680 nm;
  (i-5) a maximum transmittance $T_{700\text{-}760(0deg)MAX}$ in a wavelength of 700 to 760 nm is 2% or lower;
  (i-6) a transmittance $T_{750(0deg)}$ at a wavelength of 750 nm is 0.5% or lower;
  (i-7) a maximum transmittance $T_{760\text{-}800(0deg)MAX}$ in a wavelength of 760 to 800 nm is 1% or lower;
  (i-8) a maximum transmittance $T_{800\text{-}900(0deg)MAX}$ in a wavelength of 800 to 900 nm is 1% or lower; and
  (i-9) a maximum transmittance $T_{900\text{-}1100(0deg)MAX}$ in a wavelength of 900 to 1,100 nm is 1% or lower;
spectroscopic characteristics (i-10) to (i-18) in a spectral transmittance curve at an incident angle of 30°:
  (i-10) an average transmittance $T_{440\text{-}490(30deg)AVE}$ in the wavelength of 440 to 490 nm is 84% or higher;
  (i-11) an average transmittance $T_{490\text{-}560(30deg)AVE}$ in the wavelength of 490 to 560 nm is 90% or higher;
  (i-12) an average transmittance $T_{560\text{-}590(30deg)AVE}$ in the wavelength of 560 to 590 nm is 83% or higher;
  (i-13) a wavelength $IR50_{(30deg)}$ at which a transmittance is 50% is in the wavelength of 600 to 680 nm;
  (i-14) a maximum transmittance $T_{700\text{-}760(30deg)MAX}$ in the wavelength of 700 to 760 nm is 2% or lower;
  (i-15) a transmittance $T_{750(30deg)}$ at the wavelength of 750 nm is 0.5% or lower;
  (i-16) a maximum transmittance $T_{760\text{-}800(30deg)MAX}$ in the wavelength of 760 to 800 nm is 1% or lower;
  (i-17) a maximum transmittance $T_{800\text{-}900(30deg)MAX}$ in the wavelength of 800 to 900 nm is 1% or lower; and
  (i-18) a maximum transmittance $T_{900\text{-}1100(30deg)MAX}$ in the wavelength of 900 to 1,100 nm is 5% or lower;
  (i-19) an absolute value of a difference between the wavelength $IR50_{(0deg)}$ and the wavelength $IR50_{(30deg)}$ is 8 nm or smaller; and
spectroscopic characteristics (i-20) to (i-23) in a spectral transmittance curve at an incident angle of 70°:

(i-20) a maximum transmittance $T_{700\text{-}760(70deg)MAX}$ in the wavelength of 700 to 760 nm is 1.5% or lower;

(i-21) a transmittance $T_{750(70deg)}$ at the wavelength of 750 nm is 1.5% or lower;

(i-22) a maximum transmittance $T_{760\text{-}800(70deg)MAX}$ in the wavelength of 760 to 800 nm is 1.5% or lower; and (i-23) a maximum transmittance $T_{800\text{-}900(70deg)MAX}$ in the wavelength of 800 to 900 nm is 1.5% or lower.

The present invention can provide an optical filter that exhibits high transparency for visible light and high light blocking ability for near-infrared light of 700 nm or longer and is suppressed in the reduction of the ability to block near-infrared light of 700 nm or longer at large incident angles.

DETAILED DESCRIPTION OF EMBODIMENT

Figure 1:
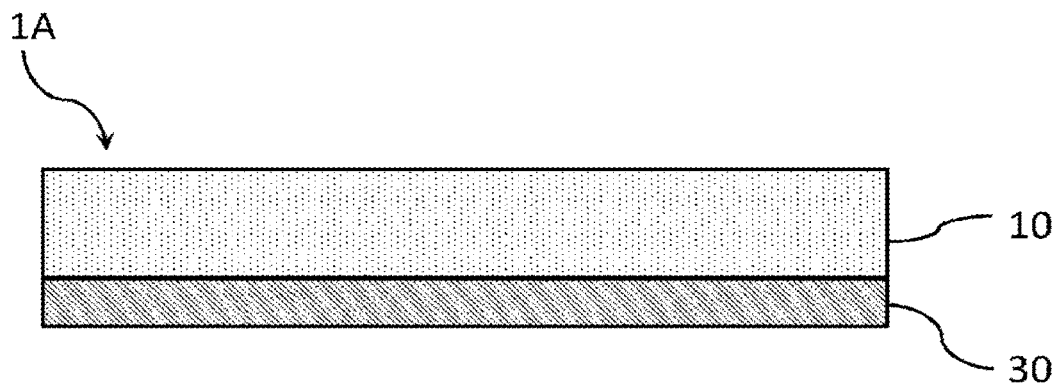
FIG. 1 is a sectional view schematically illustrating an example of an optical filter according to one embodiment.

An embodiment of the present invention will be described below.

In this specification, a near-infrared light absorbing dye and an ultraviolet light absorbing dye may be abbreviated as "NIR dye" and "UV dye," respectively.

In this specification, a compound that is represented by formula (I) will be referred to as a "compound (I)." Similar notations will be used for compounds that are represented by other formulae. A dye made of a compound (I) will likewise be referred to as a "dye (I)" and similar notations will be used for other dyes. Furthermore, a group that is represented by formula (I) will likewise be referred to as a "group (I)" and similar notations will be used for groups that are represented by other formulae.

In this specification, the term "internal transmittance" means a transmittance obtained by subtracting influence of interface reflection from a measured transmittance and is given by a formula {(measured transmittance)/(100−reflectance)}×100.

In this specification, as for a transmittance of a substrate, a transmittance of a resin film including a case that a dye is contained in a resin, and a transmittance that is measured in a state that a dye is dissolved in a solvent such as dichloromethane, an "internal transmittance" is meant in all cases including a case that only a word "transmittance" is used. On the other hand, a transmittance of an optical filter having a dielectric multilayer film is a measured transmittance.

In this specification, for example, the expression "the transmittance is 90% or higher in a particular wavelength range" means that the transmittance is not lower than 90% in the whole wavelength range, that is, the lowest transmittance in that wavelength range is 90% or higher. Likewise, for example, the expression "the transmittance is 1% or lower in a particular wavelength range" means that the transmittance is not higher than 1% in the whole wavelength range, that is, the highest transmittance in that wavelength range is 1% or lower. The same is true of the internal transmittance. An average transmittance or an average internal transmittance in a particular wavelength range is an arithmetic average of transmittances or internal transmittances for every 1 nm in that wavelength range.

Spectroscopic characteristics can be measured using an ultraviolet/visible spectrophotometer.

In this specification, the symbol "-" or the word "to" that is used to express a numerical range includes the numerical values before and after the symbol or the word as the upper limit and the lower limit of the range, respectively.

<Optical Filter>

An optical filter according to one embodiment of the present invention (hereinafter also referred to as "present filter") is an optical filter that is equipped with a substrate and a dielectric multilayer film laid on or above at least one major surface of the substrate as an outermost layer and that satisfies particular spectroscopic characteristics to be described later.

The above-mentioned substrate includes a resin film including a resin and a dye (IR) having a maximum absorption wavelength in a wavelength of 680 to 800 nm in the resin. The dye (IR) is an NIR dye. In the case where the substrate includes a dye that absorbs near-infrared light, degradation of spectroscopic characteristics of the dielectric multilayer film at large incident angles, for example, light passage in a near-infrared range and occurrence of noise, can be suppressed by the absorption characteristics of the substrate. Each dye and the resin will be described later.

Examples of configurations of the present filter will be described with reference to drawings. Each of FIGS. 1 to 4 is a schematic sectional view illustrating an example of an optical filter according to one embodiment.

An optical filter 1A illustrated in FIG. 1 is an example in which a dielectric multilayer film 30 is formed on one major surface of a substrate 10. The expression "to have a particular layer on or above a major surface of the substrate" is not limited to a case that the layer is in contact with the major surface of the substrate but includes a case that another function layer is provided between the substrate and the layer.

Figure 2:
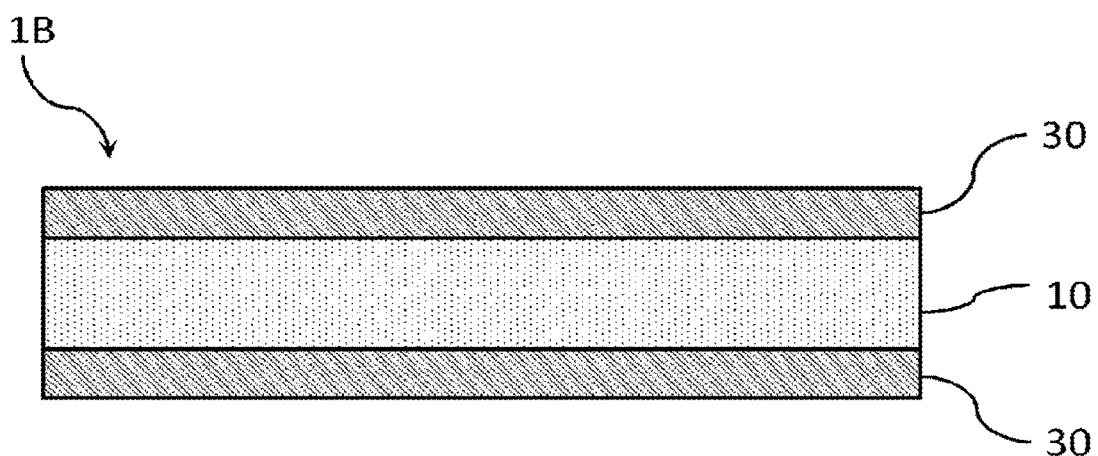
FIG. 2 is a sectional view schematically illustrating another example of an optical filter according to one embodiment.

An optical filter 1B illustrated in FIG. 2 is an example in which a dielectric multilayer film 30 is formed on both major surfaces of a substrate 10.

Figure 3:
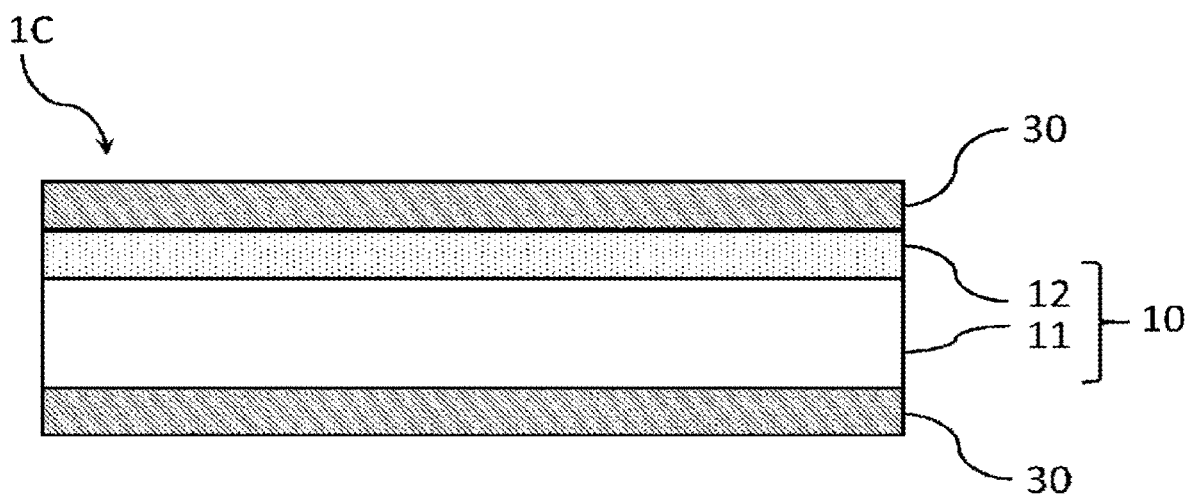
FIG. 3 is a sectional view schematically illustrating still another example of an optical filter according to one embodiment.

An optical filter 1C illustrated in FIG. 3 is an example in which a substrate 10 includes a support body 11 and a resin film 12 that is laid on one major surface of the support body 11. Furthermore, the optical filter 1C includes dielectric multilayer films 30 formed on the resin film 12 and on the major surface, on which the resin film 12 is not laid, of the support body 11.

Figure 4:
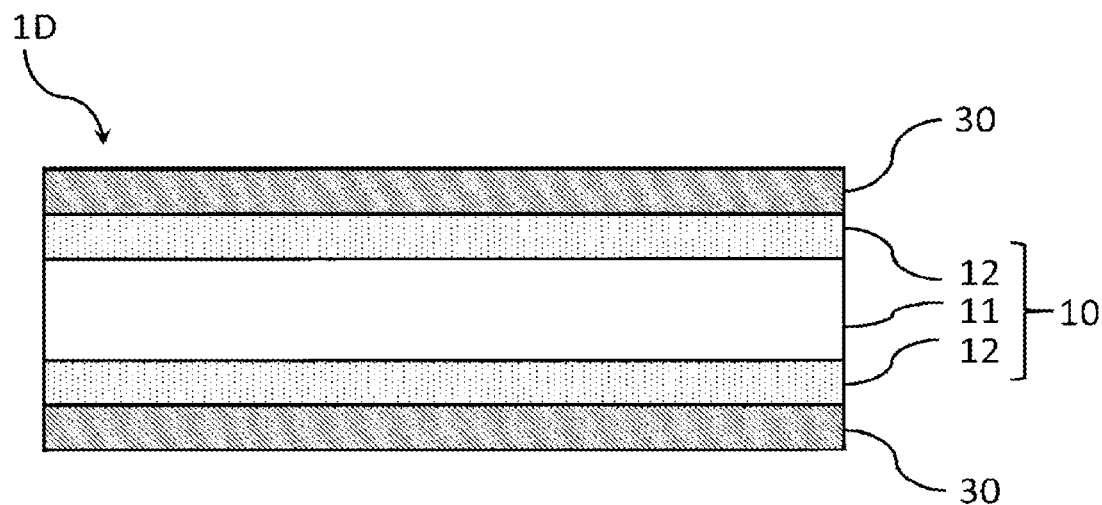
FIG. 4 is a sectional view schematically illustrating a further example of an optical filter according to one embodiment.

An optical filter 1D illustrated in FIG. 4 is an example in which a substrate 10 includes a support body 11 and resin films 12 that are laid on both major surfaces of the support body 11. Furthermore, the optical filter 1D includes dielectric multilayer films 30 that are formed on the respective resin films 12.

The optical filter according to the present invention satisfies all of the following spectroscopic characteristics (i-1) to (i-23):

Spectroscopic characteristics (i-1) to (i-9) in a spectral transmittance curve at an incident angle of 0°:
- (i-1) an average transmittance $T_{440-490(0deg)AVE}$ in a wavelength of 440 to 490 nm is 85% or higher;
- (i-2) an average transmittance $T_{490-560(0deg)AVE}$ in a wavelength of 490 to 560 nm is 90% or higher;
- (i-3) an average transmittance $T_{560-590(0deg)AVE}$ in a wavelength of 560 to 590 nm is 83% or higher;
- (i-4) a wavelength $IR50_{(0deg)}$ at which a transmittance is 50% is in a wavelength of 600 to 680 nm;
- (i-5) a maximum transmittance $T_{700-760(0deg)MAX}$ in a wavelength of 700 to 760 nm is 2% or lower;
- (i-6) a transmittance $T_{750(0deg)}$ at a wavelength of 750 nm is 0.5% or lower;
- (i-7) a maximum transmittance $T_{760-800(0deg)MAX}$ in a wavelength of 760 to 800 nm is 1% or lower;
- (i-8) a maximum transmittance $T_{800-900(0deg)MAX}$ in a wavelength of 800 to 900 nm is 1% or lower; and
- (i-9) a maximum transmittance $T_{900-1100(0deg)MAX}$ in a wavelength of 900 to 1,100 nm is 1% or lower.

Spectroscopic characteristics (i-10) to (i-18) in a spectral transmittance curve at an incident angle of 30°:
- (i-10) an average transmittance $T_{440-490(30deg)AVE}$ in the wavelength of 440 to 490 nm is 84% or higher;
- (i-11) an average transmittance $T_{490-560(30deg)AVE}$ in the wavelength of 490 to 560 nm is 90% or higher;
- (i-12) an average transmittance $T_{560-590(30deg)AVE}$ in the wavelength of 560 to 590 nm is 83% or higher;
- (i-13) a wavelength $IR50_{(30deg)}$ at which a transmittance is 50% is in the wavelength of 600 to 680 nm;
- (i-14) a maximum transmittance $T_{700-760(30deg)MAX}$ in the wavelength of 700 to 760 nm is 2% or lower;
- (i-15) a transmittance $T_{750(30deg)}$ at the wavelength of 750 nm is 0.5% or lower;
- (i-16) a maximum transmittance $T_{760-800(30deg)MAX}$ in the wavelength of 760 to 800 nm is 1% or lower;
- (i-17) a maximum transmittance $T_{800-900(30deg)MAX}$ in the wavelength of 800 to 900 nm is 1% or lower; and
- (i-18) a maximum transmittance $T_{900-1100(30deg)MAX}$ in the wavelength of 900 to 1,100 nm is 5% or lower.
- (i-19) an absolute value of a difference between the wavelength $IR50_{(0deg)}$ and the wavelength $IR50_{(30deg)}$ is 8 nm or smaller.

Spectroscopic characteristics (i-20) to (i-23) in a spectral transmittance curve at an incident angle of 70°:
- (i-20) a maximum transmittance $T_{700-760(70deg)MAX}$ in the wavelength of 700 to 760 nm is 1.5% or lower;
- (i-21) a transmittance $T_{750(70deg)}$ at the wavelength of 750 nm is 1.5% or lower;
- (i-22) a maximum transmittance $T_{760-800(70deg)MAX}$ in the wavelength of 760 to 800 nm is 1.5% or lower; and
- (i-23) a maximum transmittance $T_{800-900(70deg)MAX}$ in the wavelength of 800 to 900 nm is 1.5% or lower.

Satisfying all of the spectroscopic characteristics (i-1) to (i-23), the present filter exhibits high transparency for visible light and high blocking ability for near-infrared light and is suppressed in the reduction of the ability to block near-infrared light at a very large incident angle of 70°.

The spectroscopic characteristics (i-1) to (i-9) are characteristics obtained at an incident angle of 0°.

The satisfaction of the spectroscopic characteristic (i-1) means that the transparency in the blue range of 440 to 490 nm is high. It is preferable that the $T_{440-490(0deg)AVE}$ be 87% or higher, even preferably 87.5% or higher.

The satisfaction of the spectroscopic characteristic (i-2) means that the transparency in the blue and green range of 490 to 560 nm is high. It is preferable that the $T_{490-560(0deg)AVE}$ be 92% or higher, even preferably 93% or higher.

The satisfaction of the spectroscopic characteristic (i-3) means that the transparency in the green and yellow range of 560 to 590 nm is high. It is preferable that the $T_{560-590(0deg)AVE}$ be 84% or higher, even preferably 86% or higher.

The satisfaction of the spectroscopic characteristic (i-4) means that visible transmission light can be taken in efficiently by blocking infrared light. It is preferable that the $IR50_{(0deg)}$ be in a wavelength of 610 to 670 nm, even preferably 620 to 660 nm.

The satisfaction of the spectroscopic characteristic (i-5) means that the light blocking ability in the near-infrared range of 700 to 760 nm is high. It is preferable that the $T_{700-760(0deg)MAX}$ be 0.7% or lower, even preferably 0.5% or lower.

The satisfaction of the spectroscopic characteristic (i-6) means that the light blocking ability at the near-infrared wavelength of 750 nm is high. It is preferable that the $T_{750(0deg)}$ be 0.4% or lower, even preferably 0.2% or lower.

The satisfaction of the spectroscopic characteristics (i-7) to (i-9) means that the light blocking ability is high in the long wavelength range of 760 to 1,100 nm (i.e., near-infrared and longer wavelength range).

It is preferable that the $T_{760-800(0deg)MAX}$ be 0.8% or lower, even preferably 0.7% or lower.

It is preferable that the $T_{800-900(0deg)MAX}$ be 0.8% or lower, even preferably 0.7% or lower.

It is preferable that the $T_{900-1100(0deg)MAX}$ be 0.8% or lower, even preferably 0.7% or lower.

The spectroscopic characteristics (i-10) to (i-18) are characteristics obtained at the incident angle of 30°.

The satisfaction of the spectroscopic characteristic (i-10) means that the transparency in the blue range of 440 to 490 nm is high even at large incident angles. It is preferable that the $T_{440-490(30deg)AVE}$ be 84.5% or higher, even preferably 85% or higher.

The satisfaction of the spectroscopic characteristic (i-11) means that the transparency in the blue and green range of 490 to 560 nm is high even at large incident angles. It is preferable that the $T_{490-560(30deg)AVE}$ be 91% or higher, even preferably 92% or higher.

The satisfaction of the spectroscopic characteristic (i-12) means that the transparency in the green and yellow range of 560 to 590 nm is high even at large incident angles. It is preferable that the $T_{560-590(30deg)AVE}$ be 83.5% or higher, even preferably 85.5% or higher.

The satisfaction of the spectroscopic characteristic (i-13) means that visible transmission light can be taken in efficiently by blocking infrared light even at large incident angles. It is preferable that the $IR50_{(30deg)}$ be in a wavelength of 610 to 670 nm, even preferably 620 to 660 nm.

The satisfaction of the spectroscopic characteristic (i-14) means that the light blocking ability in the near-infrared range of 700 to 760 nm is high even at large incident angles. It is preferable that the $T_{700-760(30deg)MAX}$ be 1.3% or lower, even preferably 1.2% or lower.

The satisfaction of the spectroscopic characteristic (i-15) means that the light blocking ability at the near-infrared wavelength 750 nm is high even at large incident angles. It is preferable that the $T_{750(30deg)}$ be 0.4% or lower, even preferably 0.3% or lower.

The satisfaction of the spectroscopic characteristics (i-16) to (i-18) means that the light blocking ability is high in the long wavelength range of 760 to 1,100 nm (i.e., near-infrared and longer wavelength range) even at large incident angles.

It is preferable that the $T_{760-800(30deg)MAX}$ be 0.5% or lower, even preferably 0.4% or lower.

It is preferable that the $T_{800-900(30deg)MAX}$ be 0.5% or lower, even preferably 0.4% or lower.

It is preferable that the $T_{900-1100(30deg)MAX}$ be 4.5% or lower, even preferably 4% or lower.

The satisfaction of the spectroscopic characteristic (i-19) means that a shift is small and hence the color reproduction performance is high even at large incident angles in a near-infrared absorption band (wavelength of 600 to 680 nm). It is preferable that the absolute value of the difference between the wavelength $IR50_{(0deg)}$ and the wavelength $IR50_{(30deg)}$ be 7 nm or smaller, even preferably 6 nm or smaller.

The spectroscopic characteristics (i-20) to (i-23) are characteristics obtained at the incident angle of 70°.

The satisfaction of the spectroscopic characteristic (i-20) means that the optical filter is free of light passage even at very large incident angles and the ability to block near-infrared light in the wavelength of 700 to 760 nm is high. It is preferable that the $T_{700-760(70deg)MAX}$ be 1.4% or lower, even preferably 1.3% or lower.

The satisfaction of the spectroscopic characteristic (i-21) means that the optical filter is free of light passage even at very large incident angles and the ability to block near-infrared light at the wavelength of 750 nm is high. It is preferable that the $T_{750(70deg)}$ be 0.7% or lower, even preferably 0.6% or lower.

The satisfaction of the spectroscopic characteristic (i-22) and (i-23) means that the optical filter is free of light passage even at very large incident angles and the light blocking ability is high in the long wavelength range of 760 to 900 nm (i.e., near-infrared and longer wavelength range).

It is preferable that the $T_{760-800(70deg)MAX}$ be 1% or lower, even preferably 0.8% or lower.

It is preferable that the $T_{800-900(70deg)MAX}$ be 1.4% or lower, even preferably 1.3% or lower.

It is preferable that the optical filter according to the present invention further includes a dye (U) having a maximum absorption wavelength in a wavelength of 370 to 430 nm in the resin, and that the optical filter satisfy the following spectroscopic characteristic (i-24):

(i-24) an absolute value of a difference between $UV50_{(0deg)}$ and $UV50_{(30deg)}$ is 5 nm or smaller, where the $UV50_{(0deg)}$ is a wavelength at which a transmittance in a spectral transmittance curve in a wavelength of 400 to 440 nm at the incident angle of 0° is 50% and the $UV50_{(30deg)}$ is a wavelength at which a transmittance in a spectral transmittance curve in the wavelength of 400 to 440 nm at the incident angle of 30° is 50%.

The dye (U) is a UV dye described later. In the case where the substrate contains the ultraviolet absorption dye, degradations of the spectroscopic characteristics of the dielectric multilayer film at large incident angles such as occurrence of light passage in an ultraviolet range and occurrence of noise can be suppressed by the absorption characteristic of the substrate.

The satisfaction of the spectroscopic characteristic (i-24) means that a shift is small and hence the color reproduction performance is high even at large incident angles around an ultraviolet absorption start band (wavelength of 400 to 440 nm). It is preferable that the absolute value of the difference between the $UV50_{(0deg)}$ and the $UV50_{(30deg)}$ be 3 nm or smaller, even preferably 2 nm or smaller.

<Dielectric Multilayer Film>

In the present filter, the dielectric multilayer film is laid on or above at least one major surface of the substrate as an outermost layer.

In the present filter, it is preferable that the dielectric multilayer film satisfy all of the following spectroscopic characteristics (iv-1) to (iv-12):

Spectroscopic characteristics (iv-1) to (iv-6) in a spectral transmittance curve at the incident angle of 0°:

(iv-1) an average transmittance $T_{440-490(0deg)AVE}$ in the wavelength of 440 to 490 nm is 90% or higher;
(iv-2) an average transmittance $T_{490-560(0deg)AVE}$ in the wavelength of 490 to 560 nm is 90% or higher;
(iv-3) an average transmittance $T_{560-590(0deg)AVE}$ in the wavelength of 560 to 590 nm is 90% or higher;
(iv-4) a shortest wavelength $IR50_{(0deg)}$ at which a transmittance is 50% in a wavelength of 600 nm or longer is in a wavelength of 630 to 730 nm;
(iv-5) a maximum transmittance $T_{700-760(0deg)MAX}$ in the wavelength of 700 to 760 nm is 25% or higher; and
(iv-6) a maximum transmittance $T_{760-900(0deg)MAX}$ in the wavelength of 760 to 900 nm is 2% or lower.

Spectroscopic characteristics (iv-7) to (iv-12) in a spectral transmittance curve at the incident angle of 30°:

(iv-7) an average transmittance $T_{440-490(30deg)AVE}$ in the wavelength of 440 to 490 nm is 90% or higher;
(iv-8) an average transmittance $T_{490-560(30deg)AVE}$ in the wavelength of 490 to 560 nm is 90% or higher;
(iv-9) an average transmittance $T_{560-590(30deg)AVE}$ in the wavelength of 560 to 590 nm is 90% or higher;
(iv-10) a shortest wavelength $IR50_{(30deg)}$ at which a transmittance is 50% in a wavelength of 600 nm or longer is in the wavelength of 630 to 730 nm; (iv-11) a maximum transmittance $T_{700-760(30deg)MAX}$ in the wavelength of 700 to 760 nm is 25% or higher; and
(iv-12) a maximum transmittance $T_{760-900(30deg)MAX}$ in the wavelength of 760 to 900 nm is 2% or lower.

The satisfaction of the spectroscopic characteristics (iv-1) to (iv-3) means that the visible range transparency is high.

It is preferable that the $T_{440-490(0deg)AVE}$ be 92% or higher, even preferably 93% or higher.

It is preferable that the $T_{490-560(0deg)AVE}$ be 91% or higher, even preferably 92% or higher.

It is preferable that the $T_{560-590(0deg)AVE}$ be 92% or higher, even preferably 93% or higher.

The satisfaction of the spectroscopic characteristic (iv-4) means that visible transmission light can be taken in efficiently by blocking infrared light. It is preferable that the $IR50_{(0deg)}$ be in a wavelength of 640 to 720 nm, even preferably 650 to 710 nm.

The satisfaction of the spectroscopic characteristic (iv-5) means that light passage (ripple) through the dielectric multilayer film is allowed to occur in the wavelength of 700 to 760 nm.

It is preferable that the $T_{700-760(0deg)MAX}$ be 30% or higher, even preferably 50% or higher.

The satisfaction of the spectroscopic characteristic (iv-6) means that the light blocking ability is high in the wavelength of 760 to 900 nm. It is preferable that the $T_{760-900(0deg)MAX}$ be 1.8% or lower, even preferably 1.5% or lower.

The satisfaction of the spectroscopic characteristics (iv-7) to (iv-9) means that the visible range transparency is high at large incident angles.

It is preferable that the $T_{440-490(30deg)AVE}$ be 92% or higher, even preferably 93% or higher.

It is preferable that the $T_{490-560(30deg)AVE}$ be 92% or higher, even preferably 93% or higher.

It is preferable that the $T_{560-590(30deg)AVE}$ be 92% or higher, even preferably 93% or higher.

The satisfaction of the spectroscopic characteristic (iv-10) means that a large amount of visible light can be taken in even at large incident angles. It is preferable that the $IR50_{(30deg)}$ be in a wavelength of 640 to 720 nm, even preferably 650 to 710 nm.

The satisfaction of the spectroscopic characteristic (iv-11) means that light passage (ripple) through the dielectric multilayer film is allowed to occur in the wavelength of 700 to 760 nm even at large incident angles.

It is preferable that the $T_{700-760(30deg)MAX}$ be 30% or higher, even preferably 50% or higher.

The satisfaction of the spectroscopic characteristic (iv-12) means that the light blocking ability is high in the wavelength of 760 to 900 nm even at large incident angles. It is preferable that the $T_{760-900(30deg)MAX}$ be 1.8% or lower, even preferably 1.5% or lower.

In the dielectric multilayer film employed in the present invention, as seen from the abovementioned spectroscopic characteristic (iv-5), at the incident angle of 0° the light passage (ripple) through the dielectric multilayer film is allowed to occur in the wavelength of 700 to 760 nm. Since light in this wavelength range is absorbed by the NIR dye of the resin film (described later), even if the light passage occurs resulting light can be blocked by the optical filter as a whole. In addition, the light passage is not prone to occur in the wavelength of 800 to 900 nm even at large incident angles in a multilayer film that is designed so that the light passage occurs in the wavelength of 700 to 760 nm On the other hand, in a multilayer film that is free of the light passage at the incident angle of 0°, the light passage occurs around 800 nm at very large incident angles of about 70°. To compensate for this by the absorption ability of the NIR dye, it is necessary to use a dye whose maximum absorption wavelength is 800 nm or longer. However, a dye that exhibits absorption ability in a wavelength of 800 nm or longer tends to also absorb visible light, resulting in reduction of the visible light transmittance of the optical filter as a whole.

The optical filter according to the present invention is an optical filter that provides the high visible light transparency indicated by the spectroscopic characteristics (i-1) to (i-3) and is suppressed in an oblique incidence shift as indicated by the spectroscopic characteristics (i-20) to (i-23) by combining such a dielectric multilayer film with the resin film described later.

In the present filter, it is preferable that at least one of the dielectric multilayer film be designed as a near-infrared light reflection layer (hereinafter referred to as an "NIR reflection layer"). It is preferable that the other dielectric multilayer film be designed as an NIR reflection layer, a reflection layer having a reflection range that is not a near-infrared range, or an antireflection layer.

The NIR reflection layer is a dielectric multilayer film that is designed so as to block near-infrared light. For example, the NIR reflection layer has such wavelength selectivity as to transmit visible light and mainly reflect light in a near-infrared range other than a blocking range of the resin film that is an absorption layer. Incidentally, the reflection range of the NIR reflection layer may include a near-infrared light blocking range of the resin film. The NIR reflection layer may be designed as appropriate so as to have a specification that it exhibits not only the NIR reflection property but also blocks light in a wavelength range other than near-infrared light such as near-ultraviolet light.

For example, the NIR reflection layer is constituted by a dielectric multilayer film that is formed by laying a low refractive index dielectric film (low refractive index film) and a high refractive index dielectric film (high refractive index film) alternately. It is preferable that the refractive index of the high refractive index film be 1.6 or higher, even preferably 2.2 to 2.5. Examples of materials of the high refractive index film include $Ta_2O_5$, $TiO_2$, and $Nb_2O_5$, among which $TiO_2$ is preferable from the viewpoints of the ease of film formation, the reproducibility of a refractive index etc., stability, etc.

On the other hand, it is preferable that the refractive index of the low refractive index film be lower than 1.6, even preferably 1.45 or higher and 1.55 or lower. Examples of materials of the low refractive index film include $SiO_2$ and $SiO_xN_y$. $SiO_2$ is preferable from the viewpoints of the reproducibility of film formation, stability, economic efficiency, etc.

Examples of a method for forming a multilayer film that allows the light passage (ripple) to occur in the wavelength of 700 to 760 nm at the incident angle of 0° include combining several kinds of dielectric multilayer films that are different from each other in spectroscopic characteristics in transmission and selection of a desired wavelength band. Specifically, adjustments can be made to a desired light blocking band by deviating reflection light based on a proper balance between silica and titania.

In the NIR reflection layer, it is preferable that the total number of lamination layers of the dielectric multilayer film that constitutes the reflection layer be 20 or larger, even preferably 30 or larger, and further preferably 35 or larger. However, since a warp or the like becomes prone to occur and the film thickness increases in the case where the total number of lamination layers becomes too large, it is preferable that the total number of lamination layers be 100 or smaller, even preferably 75 or smaller and further preferably 60 or smaller.

In addition, it is preferable that the total thickness of the reflection layer be 2 to 10 μm.

In the case where the total number of lamination layers and the thickness of the dielectric multilayer film are in the above ranges, the NIR reflection layer makes it possible to suppress the incident angle dependence while satisfying the miniaturization requirement and maintaining high productivity.

Incidentally, a dielectric multilayer film can be formed by, for example, vacuum film forming processes such as a CVD method, a sputtering method, and a vacuum evaporation method and wet film forming processes such as a spray method and a dip method.

The NIR reflection layer may provide prescribed spectroscopic characteristics by either a single layer (a group of dielectric multilayer films) or two or more layers. In the case where the NIR reflection layer includes two or more layers, they may be either the same or different in structure. In the case where the NIR reflection layer includes two or more layers, usually plural reflection layers having different reflection bands are employed as them. In the case where two reflection layers are provided, they may be such that one is a near-infrared reflection layer that blocks light in a shorter wavelength band of a near-infrared range and the other is a near-infrared/near-ultraviolet reflection layer that blocks both of light in a longer wavelength band of the near-infrared range and light in a near-ultraviolet range.

Examples of the anti-reflection layer include a dielectric multilayer film, an intermediate refractive index medium, and a moss eye structure in which the refractive index varies gradually. Among these examples, a dielectric multilayer film is preferable from the viewpoints of optical efficiency and productivity. The anti-reflection layer is formed by laying dielectric films alternately like the reflection layer is.
<Substrate>

In the optical filter according to the present invention, the substrate includes a resin film including an NIR dye (IR) (described later) and a resin.
<Spectroscopic Characteristics of Resin Film>

It is preferable that the resin film satisfy all of the following spectroscopic characteristics (ii-1) to (ii-4):
  (ii-1) an average internal transmittance $T_{440\text{-}490AVE}$ in a spectral transmittance curve in the wavelength of 440 to 490 nm is 84% or higher;
  (ii-2) an average internal transmittance $T_{490\text{-}560AVE}$ in the spectral transmittance curve in the wavelength of 490 to 560 nm is 94% or higher;
  (ii-3) an average internal transmittance $T_{560\text{-}590AVE}$ in the spectral transmittance curve in the wavelength of 560 to 590 nm is 80% or higher; and
  (ii-4) a maximum internal transmittance $T_{700\text{-}760MAX}$ in the spectral transmittance curve in the wavelength of 700 to 760 nm is 5% or lower.

The satisfaction of the spectroscopic characteristics (ii-1) to (ii-3) means that the transmittance in a visible range is high.

It is preferable that the $T_{440\text{-}490AVE}$ be 85% or higher, even preferably 86% or higher.

It is preferable that the $T_{490\text{-}560AVE}$ be 95% or higher, even preferably 96% or higher.

It is preferable that the $T_{560\text{-}590AVE}$ be 84% or higher, even preferably 86% or higher.

The satisfaction of the spectroscopic characteristic (ii-4) means that light in a broad wavelength of 700 to 760 nm can be absorbed.

It is preferable that the $T_{700\text{-}760MAX}$ be 1% or lower, even preferably 0.5% or lower.

It is preferable that the resin film further satisfy the following spectroscopic characteristic (ii-5):
  (ii-5) a maximum internal transmittance $T_{760\text{-}800MAX}$ in a spectral transmittance curve in the wavelength of 760 to 800 nm is 15% or lower.

It is preferable that the $T_{760\text{-}800MAX}$ be 1% or lower, further preferably 0.5% or lower.
<Nir Dye>

The NIR dye (IR) is an NIR dye having a maximum absorption wavelength in a wavelength of 680 to 800 nm in the resin. Containing this dye makes it possible to cut near-infrared light effectively. The resin is a resin that constitutes the resin film.

It is preferable that in a spectral transmittance curve of a coating film formed by dissolving the dye (IR) in the resin so that a transmittance at a maximum absorption wavelength becomes 10% to obtain a solution and applying the solution to an alkali glass plate, the dye (IR) satisfy all of the following spectroscopic characteristics (iii-1) to (iii-3):
  (iii-1) an average internal transmittance $T_{440\text{-}490AVE}$ in the spectral transmittance curve in the wavelength of 440 to 490 nm is 94% or higher;
  (iii-2) an average internal transmittance $T_{490\text{-}560AVE}$ in the spectral transmittance curve in the wavelength of 490 to 560 nm is 94% or higher; and
  (iii-3) an average internal transmittance $T_{560\text{-}590AVE}$ in the spectral transmittance curve in the wavelength of 560 to 590 nm is 94% or higher.

The satisfaction of the spectroscopic characteristics (iii-1) to (iii-3) means that the transparency in a visible range is high.

It is preferable that the $T_{440\text{-}490AVE}$ be 95% or higher, even preferably 96% or higher.

It is preferable that the $T_{490\text{-}560AVE}$ be 96% or higher, even preferably 98% or higher.

It is preferable that the $T_{560\text{-}590AVE}$ be 95% or higher, even preferably 96% or higher.

The NIR dye (IR) may either consist of one compound or contain two or more compounds. From the viewpoint that the above spectroscopic characteristic (ii-4) of the resin film, that is, light in a wide wavelength of 700 to 760 nm is absorbed, can be satisfied easily, it is preferable that the NIR dye (IR) contain three or more compounds each having a maximum absorption wavelength in a wavelength of 680 to 800 nm in the resin. In particular, it is even preferable that the NIR dye (IR) contain:
  one or more compounds (A) each having a maximum absorption wavelength in a wavelength of 680 nm or longer and shorter than 720 nm in the resin;
  one or more compounds (B) each having a maximum absorption wavelength in a wavelength of 720 nm or longer and shorter than 740 nm in the resin; and
  one or more compounds (C) each having a maximum absorption wavelength in a wavelength of 740 nm or longer and 780 nm or shorter in the resin.

From the viewpoints of the transparency in a visible range, the solubility in the resin, and durability, it is preferable that the NIR dye (IR) be selected from a squarylium dye or a cyanine dye.
<Squarylium Dye>

It is preferable that the squarylium dye be a compound represented by the following Formula (I) or (II).

It is noted that in the case where the same symbol appears two or more times in a squarylium dye compound, those symbols may represent either the same thing or different things. This also applies to a cyanine dye.
<Squarylium Compound (I)>

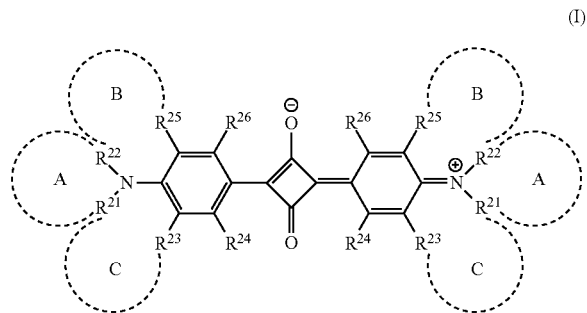

(I)

Symbols in the above formula have the following meanings.

$R^{24}$ and $a^{26}$ represent, independently of each other, a hydrogen atom, a halogen atom, a hydroxyl group, an alkyl group or an alkoxy group (each of them has a carbon number of 1 to 20), an acyloxy group having a carbon number of 1 to 10, an aryl group having a carbon number of 6 to 11, an alaryl group having a carbon number of 7 to 18 that may include a substituent and may have an oxygen atom between carbon atoms, —$NR^{27}R^{28}$ ($R^{27}$ and $R^{28}$ represent, independently of each other, a hydrogen atom or an alkyl group having a carbon number of 1 to 20), —C(=O)—$R^{29}$ ($R^{29}$ represents a hydrogen atom, a halogen atom, a hydroxyl group, or a hydrocarbon group having a carbon number of 1 to 25 that may include a substituent and may include an unsaturated bond, an oxygen atom, or a saturated or unsaturated ring structure between carbon atoms), —$NHR^{30}$ or $St_2$-$R^{30}$ (each $R^{30}$ represents a hydrocarbon group having a carbon number of 1 to 25 in which one or more hydrogen atoms may be replaced by a halogen atom, a hydroxyl group, a carboxy group, a sulfo group, or a cyano group and that may include an unsaturated bond, an oxygen atom, or a saturated or unsaturated ring structure between carbon atoms), or a group represented by the following Formula (S) ($R^{41}$ and $R^{42}$ represent, independently of each other, a hydrogen atom, a halogen atom, or an alkyl group or an alkoxy group (each of them has a carbon number of 1 to 10) and k represents 2 or 3).

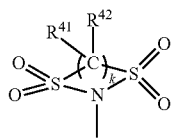

(S)

$R^{21}$ and $R^{22}$, $R^{22}$ and $R^{25}$, and $R^{21}$ and $R^{23}$ may be connected to form a heterocycle A, a heterocycle B, and a heterocycle C each having five or six members, respectively, together with a nitrogen atom.

$R^{21}$ and $R^{22}$ form, in the case where the heterocycle A is formed, as a divalent group -Q- as a result of their connection, an alkylene group or an alkyleneoxy group whose hydrogen atom may be replaced by an alkyl group having a carbon number of 1 to 6, an aryl group having a carbon number of 6 to 10, or an acyloxy group having a carbon number of 1 to 10 that may include a substituent.

$R^{22}$ and $R^{25}$ form, in the case where the heterocycle B is formed, as a result of their connection, and $R^{21}$ and $R^{23}$ form, in the case where the heterocycle C is formed, as a result of their connection, divalent groups —$X^1$—$Y^1$— and —$X^2$—$Y^2$— (the side of connection to the nitrogen is $X^1$ and $X^2$) that are groups in which each of $X^1$ and $X^2$ is represented by the following Formula (1x) or (2x) and each of $Y^1$ and $Y^2$ is represented by one of the following Formulae (1y) to (5y). In the case where each of $X^1$ and $X^2$ is a group represented by the following Formula (2x), each of $Y^1$ and $Y^2$ may be a single bond in which case an oxygen atom may exist between carbon atoms.

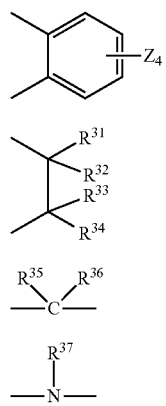

(1x)

(2x)

(1y)

(2y)

(3y)

(4y)

(5y)

In Formula (1x), four Zs represent, independently of each other, a hydrogen atom, a hydroxyl group, an alkyl group or an alkoxy group (each of them has a carbon number of 1 to 6), or —$NR^{38}R^{39}$ ($R^{38}$ and $R^{39}$ represent, independently of each other, a hydrogen atom or an alkyl group having a carbon number of 1 to 20). $R^{31}$ to $R^{36}$ represent, independently of each other, a hydrogen atom, an alkyl group having a carbon number of 1 to 6, or an aryl group having a carbon number of 6 to 10. $R^{37}$ represents an alkyl group having a carbon number of 1 to 6 or an aryl group having a carbon number of 6 to 10.

Each of $R^{27}$, $R^{28}$, $R^{29}$, $R^{31}$ to $R^{37}$, and $R^{21}$ to $R^{23}$ and $R^{25}$ not forming a heterocycle may form a 5-membered ring or a 6-membered ring by connecting to another one of them. $R^{31}$ and $R^{36}$ and/or $R^{31}$ and $R^{37}$ may be connected to each other directly.

In the case where a heterocycle in not formed, $R^{21}$, $R^{22}$, $R^{23}$, and $R^{25}$ represent, independently of each other, a hydrogen atom, a halogen atom, a hydroxyl group, an alkyl group or an alkoxy group (each of them has a carbon number of 1 to 20), an acyloxy group having a carbon number of 1-10, an aryl group having a carbon number of 6 to 11, or an alaryl group having a carbon number of 7 to 18 that may include a substituent and may have an oxygen atom between carbon atoms.

For example, the compound (I) is a compound represented by one of Formulae (I-1) to (I-3). From the viewpoints of solubility in the resin, heat resistance and light resistance in the resin, and the visible light transmittance of a resin layer containing it, it is particularly preferable that the compound (I) be a compound represented by Formula (I-1).

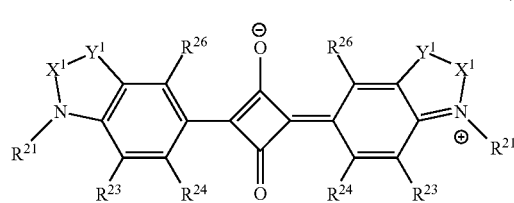

(I-1)

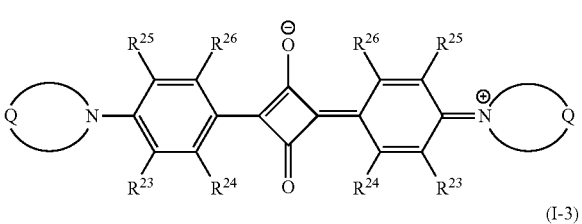

(I-2)

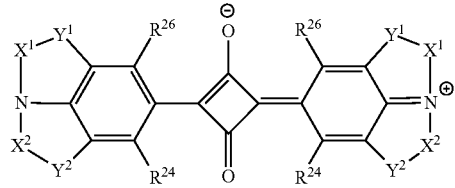

(I-3)

The symbols used in Formulae (I-1) to (I-3) have the same meanings as the same symbols used in Formula (I) and preferable modes of implementation of what are represented by the former are also the same as those of the latter.

In the compound (I-1), $X^1$ is preferably the group (2x) and $Y^1$ is preferably a single bond or the group (1y). In this case, $R^{31}$ to $R^{36}$ are preferably a hydrogen atom or an alkyl group having a carbon number of 1 to 3 and even preferably a hydrogen atom or a methyl group. Specific examples of —$Y^1$—$X^1$— include a divalent organic group represented by one of the following Formulae (11-1) to (12-3).

—C(CH$_3$)$_2$—CH(CH$_3$)—      (11-1)

—C(CH$_3$)$_2$—CH$_2$—      (11-2)

—C(CH$_3$)$_2$—CH(C$_2$H$_5$)—      (11-3)

—C(CH$_3$)$_2$—C(CH$_3$)(nC$_3$H$_7$)—      (11-4)

—C(CH$_3$)$_2$—CH$_2$—CH$_2$—      (12-1)

—C(CH$_3$)$_2$—CH$_2$—CH(CH$_3$)—      (12-2)

—C(CH$_3$)$_2$—CH(CH$_3$)—CH$_2$—      (12-3)

In the compound (I-1), from the viewpoints of solubility, heat resistance, and the steepness of a variation around the boundary between a visible range and a near-infrared range of a spectral transmittance curve, it is even preferable that each of $R^{21}$ be, independently of each other, a group represented by the following Formula (4-1) or (4-2):

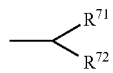
(4-1)

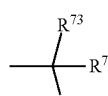
(4-2)

In Formulae (4-1) and (4-2), $R^{71}$ to $R^{75}$ represent, independently of each other, a hydrogen atom, a halogen atom, or an alkyl group having a carbon number of 1 to 4.

In the compound (I-1), it is preferable that $R^{24}$ be —NR$^{27}$R$^{28}$. From the viewpoint of solubility in the resin and a coating solvent, it is preferable that —NR$^{27}$R$^{28}$ be —NH—C(=O)—R$^{29}$ or —NH—SO$_2$—R$^{30}$.

Formula (I-11) represents a compound that is a version of the compound (I-1) in which $R^{24}$ is a compound —NH—C(=O)—R$^{29}$.

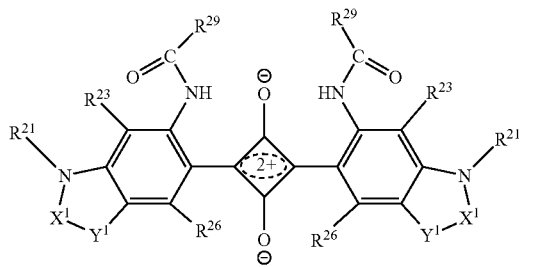
(I-11)

It is preferable that $R^{23}$ and $R^{26}$ be, independently of each other, a hydrogen atom, a halogen atom, or an alkyl group or an alkoxy group (each of them has a carbon number of 1 to 6). It is even preferable that each of $R^{23}$ and $R^{26}$ be a hydrogen atom.

It is preferable that $R^{29}$ be an alkyl group having a carbon number of 1 to 20 that may include a substituent, an aryl group having a carbon number of 6 to 10 that may include a substituent, or an alaryl group having a carbon number of 7 to 18 that may have an oxygen atom between carbon atoms. Examples of the substituent include a hydroxyl group, a carboxy group, a sulfo group, a cyano group, an alkyl group having a carbon number of 1 to 6, a fluoroalkyl group having a carbon number of 1 to 6, an alkoxy having a carbon number of 1 to 6, and an acyloxy group having a carbon number of 1 to 6.

It is preferable that $R^{29}$ be a group that is selected from a linear, branched, or cyclic alkyl group having a carbon number of 1 to 17, a phenyl group that may be replaced by an alkoxy group having a carbon number of 1 to 6, and an alaryl group having a carbon number of 7 to 18 that may have an oxygen atom between carbon atoms.

Usable as each of $R^{29}$ independently of each other is a group that is a hydrocarbon group having at least one branch and having a carbon number of 5 to 25 in which one or more hydrogen atoms may be replaced by a hydroxyl group, a carboxy group, a sulfo group, or a cyano group and that may include an unsaturated bond, an oxygen atom, or a saturated or unsaturated ring structure between carbon atoms.

More specific examples of the compound (I-11) are compounds shown in the following table. In the compounds shown in the following table, each symbol has the same meaning on whichever side of the squarylium framework it exists.

TABLE 1

| | Substituent | | | | |
|---|---|---|---|---|---|
| Dye symbol | —Y$^1$—X$^1$— | $R^{21}$ | $R^{29}$ | $R^{23}$ | $R^{26}$ |
| (I-11-1) | —C(CH$_3$)$_2$—C(CH$_3$)(nC$_3$H$_7$)— | —CH$_3$ | —CH(C$_2$H$_5$)(nC$_4$H$_9$) | H | H |
| (I-11-2) | —C(CH$_3$)$_2$—C(CH$_3$)(nC$_3$H$_7$)— | —C$_2$H$_5$ | —CH(C$_2$H$_5$)(nC$_4$H$_9$) | H | H |
| (I-11-3) | —C(CH$_3$)$_2$—C(CH$_3$)(nC$_3$H$_7$)— | -nC$_3$H$_7$ | —CH(C$_2$H$_5$)(nC$_4$H$_9$) | H | H |
| (I-11-4) | —C(CH$_3$)$_2$—C(CH$_3$)(nC$_3$H$_7$)— | —CH(CH$_3$)$_2$ | —CH(C$_2$H$_5$)(nC$_4$H$_9$) | H | H |
| (I-11-5) | —C(CH$_3$)$_2$—C(CH$_3$)(nC$_3$H$_7$)— | —CH$_3$ | -nC$_7$H$_{15}$ | H | H |
| (I-11-6) | —C(CH$_3$)$_2$—C(CH$_3$)(nC$_3$H$_7$)— | —C$_2$H$_5$ | -nC$_7$H$_{15}$ | H | H |
| (I-11-7) | —C(CH$_3$)$_2$—C(CH$_3$)(nC$_3$H$_7$)— | -nC$_3$H$_7$ | -nC$_7$H$_{15}$ | H | H |
| (I-11-8) | —C(CH$_3$)$_2$—C(CH$_3$)(nC$_3$H$_7$)— | —CH(CH$_3$)$_2$ | -nC$_7$H$_{15}$ | H | H |
| (I-11-9) | —C(CH$_3$)$_2$—C(CH$_3$)(nC$_3$H$_7$)— | —CH$_3$ | —CH$_3$ | H | H |
| (I-11-10) | —C(CH$_3$)$_2$—C(CH$_3$)(nC$_3$H$_7$)— | —C$_2$H$_5$ | —CH$_3$ | H | H |
| (I-11-11) | —C(CH$_3$)$_2$—C(CH$_3$)(nC$_3$H$_7$)— | -nC$_3$H$_7$ | —CH$_3$ | H | H |

TABLE 1-continued

| Dye symbol | —Y¹—X¹— | R²¹ | R²⁹ | R²³ | R²⁶ |
|---|---|---|---|---|---|
| (I-11-12) | —C(CH₃)₂—C(CH₃)(nC₃H₇)— | —CH(CH₃)₂ | —CH₃ | H | H |
| (I-11-13) | —C(CH₃)₂—C(CH₃)(nC₃H₇)— | —CH₃ | —CF₃ | H | H |
| (I-11-14) | —C(CH₃)₂—C(CH₃)(nC₃H₇)— | —C₂H₅ | —CF₃ | H | H |
| (I-11-15) | —C(CH₃)₂—C(CH₃)(nC₃H₇)— | -nC₃H₇ | —CF₃ | H | H |
| (I-11-16) | —C(CH₃)₂—C(CH₃)(nC₃H₇)— | —CH(CH₃)₂ | —CF₃ | H | H |
| (I-11-17) | —C(CH₃)₂—CH(CH₃)— | —CH₃ | —CH(C₂H₅)(nC₄H₉) | H | H |
| (I-11-18) | —C(CH₃)₂—CH(CH₃)— | —C₂H₅ | —CH(C₂H₅)(nC₄H₉) | H | H |
| (I-11-19) | —C(CH₃)₂—CH(CH₃)— | -nC₃H₇ | —CH(C₂H₅)(nC₄H₉) | H | H |
| (I-11-20) | —C(CH₃)₂—CH(CH₃)— | —CH(CH₃)₂ | —CH(C₂H₅)(nC₄H₉) | H | H |
| (I-11-21) | —C(CH₃)₂—CH(CH₃)— | —CH₃ | -nC₇H₁₅ | H | H |
| (I-11-22) | —C(CH₃)₂—CH(CH₃)— | —C₂H₅ | -nC₇H₁₅ | H | H |
| (I-11-23) | —C(CH₃)₂—CH(CH₃)— | -nC₃H₇ | -nC₇H₁₅ | H | H |
| (I-11-24) | —C(CH₃)₂—CH(CH₃)— | —CH(CH₃)₂ | -nC₇H₁₅ | H | H |
| (I-11-25) | —C(CH₃)₂—CH(CH₃)— | —CH₃ | —CH₃ | H | H |
| (I-11-26) | —C(CH₃)₂—CH(CH₃)— | —C₂H₅ | —CH₃ | H | H |
| (I-11-27) | —C(CH₃)₂—CH(CH₃)— | -nC₃H₇ | —CH₃ | H | H |
| (I-11-28) | —C(CH₃)₂—CH(CH₃)— | —CH(CH₃)₂ | —CH₃ | H | H |
| (I-11-29) | —C(CH₃)₂—CH(CH₃)— | —CH₃ | —CF₃ | H | H |
| (I-11-30) | —C(CH₃)₂—CH(CH₃)— | —C₂H₅ | —CF₃ | H | H |
| (I-11-31) | —C(CH₃)₂—CH(CH₃)— | -nC₃H₇ | —CF₃ | H | H |
| (I-11-32) | —C(CH₃)₂—CH(CH₃)— | —CH(CH₃)₂ | —CF₃ | H | H |

Among the above examples of the compound (I-11), the compounds (I-11-1) to (I-11-12) are preferable from the viewpoints of transparency in a visible range, solubility in the resin, and durability. Among these examples, the compounds (I-11-1) to (I-11-4) are even preferable from the viewpoints of solubility in the resin and durability.

Formula (I-12) represents a compound that is a version of the compound (I-1) in which $R^{24}$ is —NH—SO₂—$R^{30}$.

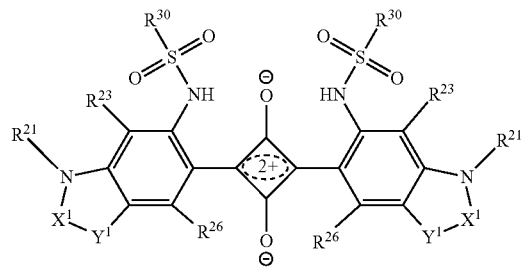

(I-12)

It is preferable that $R^{23}$ and $R^{26}$ be, independently of each other, a hydrogen atom, a halogen atom, or an alkyl group or an alkoxy group (each of them has a carbon number of 1 to 6). It is even preferable that each of $R^{23}$ and $R^{26}$ be a hydrogen atom.

From the viewpoint of light resistance, it is preferable that each of $R^{30}$ be, independently of each other, an alkyl group or an alkoxy group (each of them has a carbon number of 1 to 12 and may have a branch) or a hydrocarbon group having a carbon number of 6 to 16 that includes an unsaturated ring structure. Examples of the unsaturated ring structure include benzene, toluene, xylene, furan, and benzofuran. It is even preferable that each of $R^{30}$ be, independently of each other, an alkyl group or an alkoxy group (each of them has a carbon number of 1 to 12 and may have a branch). It is noted that in each group represented by $R^{30}$ all or part of the hydrogen atoms may be replaced by a halogen atom, in particular, a fluorine atom.

More specific examples of the compound (I-12) are compounds shown in the following table. In the compounds shown in the following table, each symbol has the same meaning on whichever side of the squarylium framework it exists.

TABLE 2

| Dye symbol | —Y¹—X¹— | R²¹ | R³⁰ | R²³ | R²⁶ |
|---|---|---|---|---|---|
| (I-12-1) | —C(CH₃)₂—C(CH₃)(nC₃H₇)— | —CH₃ | -nC₈H₁₇ | H | H |
| (I-12-2) | —C(CH₃)₂—C(CH₃)(nC₃H₇)— | —C₂H₅ | -nC₈H₁₇ | H | H |
| (I-12-3) | —C(CH₃)₂—C(CH₃)(nC₃H₇)— | -nC₃H₇ | -nC₈H₁₇ | H | H |
| (I-12-4) | —C(CH₃)₂—C(CH₃)(nC₃H₇)— | —CH(CH₃)₂ | -nC₈H₁₇ | H | H |
| (I-12-5) | —C(CH₃)₂—C(CH₃)(nC₃H₇)— | —CH₃ | -nC₄H₉ | H | H |
| (I-12-6) | —C(CH₃)₂—C(CH₃)(nC₃H₇)— | —C₂H₅ | -nC₄H₉ | H | H |
| (I-12-7) | —C(CH₃)₂—C(CH₃)(nC₃H₇)— | -nC₃H₇ | -nC₄H₉ | H | H |
| (I-12-8) | —C(CH₃)₂—C(CH₃)(nC₃H₇)— | —CH(CH₃)₂ | -nC₄H₉ | H | H |
| (I-12-9) | —C(CH₃)₂—C(CH₃)(nC₃H₇)— | —CH₃ | —CF₃ | H | H |
| (I-12-10) | —C(CH₃)₂—C(CH₃)(nC₃H₇)— | —C₂H₅ | —CF₃ | H | H |
| (I-12-11) | —C(CH₃)₂—C(CH₃)(nC₃H₇)— | -nC₃H₇ | —CF₃ | H | H |
| (I-12-12) | —C(CH₃)₂—C(CH₃)(nC₃H₇)— | —CH(CH₃)₂ | —CF₃ | H | H |
| (I-12-13) | —C(CH₃)₂—CH(CH₃)— | —CH₃ | -nC₈H₁₇ | H | H |
| (I-12-14) | —C(CH₃)₂—CH(CH₃)— | —C₂H₅ | -nC₈H₁₇ | H | H |
| (I-12-15) | —C(CH₃)₂—CH(CH₃)— | -nC₃H₇ | -nC₈H₁₇ | H | H |

TABLE 2-continued

| Dye symbol | Substituent —Y¹—X¹— | $R^{21}$ | $R^{30}$ | $R^{23}$ | $R^{26}$ |
|---|---|---|---|---|---|
| (I-12-16) | —C(CH₃)₂—CH(CH₃)— | —CH(CH₃)₂ | -nC₈H₁₇ | H | H |
| (I-12-17) | —C(CH₃)₂—CH(CH₃)— | —CH₃ | -nC₄H₉ | H | H |
| (I-12-18) | —C(CH₃)₂—CH(CH₃)— | —C₂H₅ | -nC₄H₉ | H | H |
| (I-12-19) | —C(CH₃)₂—CH(CH₃)— | -nC₃H₇ | -nC₄H₉ | H | H |
| (I-12-20) | —C(CH₃)₂—CH(CH₃)— | —CH(CH₃)₂ | -nC₄H₉ | H | H |
| (I-12-21) | —C(CH₃)₂—CH(CH₃)— | —CH₃ | —CF₃ | H | H |
| (I-12-22) | —C(CH₃)₂—CH(CH₃)— | —C₂H₅ | —CF₃ | H | H |
| (I-12-23) | —C(CH₃)₂—CH(CH₃)— | -nC₃H₇ | —CF₃ | H | H |
| (I-12-24) | —C(CH₃)₂—CH(CH₃)— | —CH(CH₃)₂ | —CF₃ | H | H |

Among the above examples of the compound (I-12), the compounds (I-12-1) to (I-12-8) and (I-12-13) to (I-12-20) are preferable from the viewpoints of transparency in a visible range, solubility in the resin, and durability. Among these examples, the compounds (I-12-1) to (I-12-5) are even preferable from the viewpoints of solubility in the resin and durability.

<Squarylium Compound (II)>

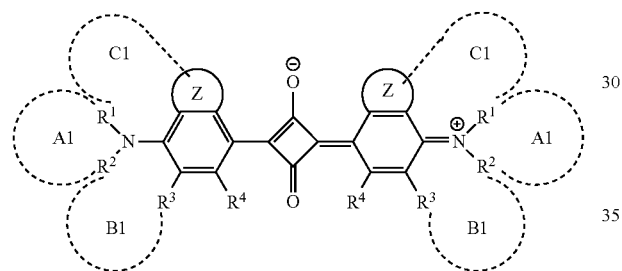

(II)

Symbols in the above formula have the following meanings.

Rings Z are, independently of each other, a 5-membered ring or a 6-membered ring having zero to three heteroatoms in the ring. The hydrogen atoms belonging to each ring Z may each be replaced.

$R^1$ and $R^2$, $R^2$ and $R^3$, and $R^1$ and a carbon atom or a heteroatom included in the ring Z may form a heterocycle A1, a heterocycle B1, and a heterocycle C1, respectively, together with a nitrogen atom through mutual connection. In this case, the hydrogen atoms included in each of the heterocycles A1, B1, and C1 may be replaced. $R^1$ and $R^2$ represent, in the case where they do not form the heterocycle, independently of each other, a hydrogen atom, a halogen atom, or a hydrocarbon group that may include an unsaturated bond, a heteroatom, or a saturated or unsaturated ring structure between carbon atoms and may include a substituent. $R^4$ and $R^3$ that does not form the heterocycle represent, independently of each other, a hydrogen atom, a halogen atom, or an alkyl group or an alkoxy group (each of them may include a heteroatom between carbon atoms and may include a substituent.

Examples of the compound (II) include a compound represented by one of Formulae (II-1) to (II-3). The compound represented by Formula (II-3) is particularly preferable from the viewpoints of solubility in the resin and visible light transparency in the resin.

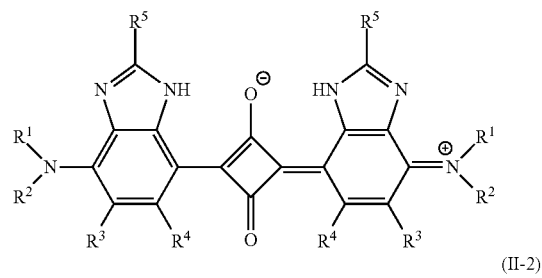

(II-1)

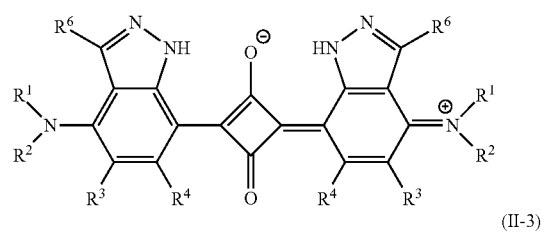

(II-2)

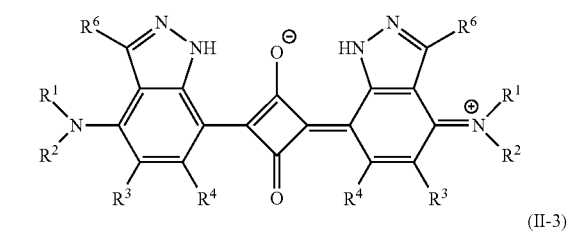

(II-3)

In Formula (II-1) and (II-2), $R^1$ and $R^2$ represent, independently of each other, a hydrogen atom, a halogen atom, or an alkyl group having a carbon number of 1 to 15 that may include a substituent. $R^3$ and $R^6$ represent, independently of each other, a hydrogen atom, a halogen atom, or an alkyl group having a carbon number of 1 to 10 that may include a substituent.

In Formulae (II-3), $R^1$, $R^4$, and $R^9$ to $R^{12}$ represent, independently of each other, a hydrogen atom, a halogen atom, or an alkyl group having a carbon number of 1 to 15 that may include a substituent. $R^7$ to $R^8$ represent, independently of each other, a hydrogen atom, a halogen atom, or an alkyl group having a carbon number of 1 to 5 that may include a substituent.

From the viewpoints of solubility in the resin, visible light transparency, etc., it is preferable that $R^1$ and $R^2$ in the compounds (II-1) and (II-2) represent, independently of each other, an alkyl group having a carbon number of 1 to 15, even preferably an alkyl group having a carbon number of 7 to 15. It is further preferable that at least one of $R^1$ and $R^2$ be an alkyl group having a carbon number of 7 to 15 that includes a branched chain. It is particularly preferable that both of $R^1$ and $R^2$ be an alkyl group having a carbon number of 8 to 15 that includes a branched chain.

From the viewpoints of solubility in a transparent resin, visible light transparency, etc., it is preferable that each of $R^1$ in the compound (II-3) represents, independently of each other, an alkyl group having a carbon number of 1 to 15, even preferably an alkyl group having a carbon number of 1 to 10 and particularly preferably an ethyl group or an isopropyl group.

From the viewpoints of visible light transparency and the ease of synthesis, it is preferable that $R^4$ represent a hydrogen atom or a halogen atom, particularly preferably a hydrogen atom.

It is preferable that $R^7$ and $R^8$ represent, independently of each other, a hydrogen atom, a halogen atom, or an alkyl group having a carbon number of 1 to 5 that may be replaced by a halogen atom, even preferably a hydrogen atom, a halogen atom, or a methyl group.

It is preferable that $R^9$ to $R^{12}$ represent, independently of each other, a hydrogen atom, a halogen atom, or an alkyl group having a carbon number of 1 to 5 that may be replaced by a halogen atom.

Examples of —$CR^9R^{10}$—$CR^{11}R^{12}$— include divalent an organic group represented by one of the following groups (13-1) to (13-5):

  —CH(CH₃)—C(CH₃)₂— (13-1)

  —C(CH₃)₂—CH(CH₃)— (13-2)

  —C(CH₃)₂—CH₂— (13-3)

  —C(CH₃)₂—CH(C₂H₅)— (13-4)

  —CH(CH₃)—C(CH₃)(CH₂—CH(CH₃)₂)— (13-5)

More specific examples of the compound (II-3) are compounds shown in the following table. In the compounds shown in the following table, each symbol has the same meaning on whichever side of the squarylium framework it exists.

resin, and durability. Among these examples, the compound (II-3-2) is even preferable from the viewpoint of solubility in the resin.

Each of the compounds (I) and (II) can be manufactured by a known method(s). The compound (I) can be manufactured by methods described in U.S. Pat. No. 5,543,086B, US2014/0061505, and WO2014/088063. The compound (II) can be manufactured by a method described in WO2017/135359.

<Cyanine Dye>

It is preferable that the cyanine dye be a compound represented by the following Formula (III).

<Cyanine Compound (III)>

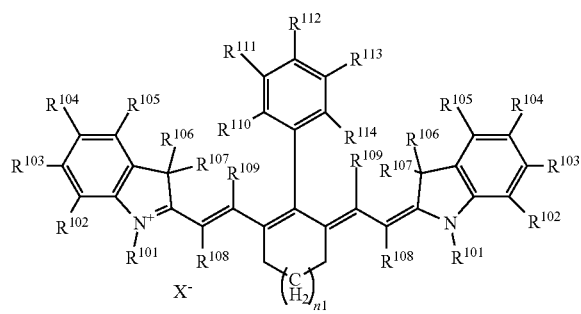

(III)

Symbols in the above formula have the following meanings.

$R^{101}$ to $R^{109}$ represent, independently of each other, a hydrogen atom, a halogen atom, an alkyl group having a carbon number of 1 to 15 that may include a substituent, or an aryl group having a carbon number of 5 to 20. $R^{110}$ to $R^{114}$ represent, independently of each other, a hydrogen atom, a halogen atom, or an alkyl group having a carbon number of 1 to 15.

$X^-$ represents a monovalent anion.

Symbol n1 represents 0 or 1. A hydrogen atom connected to the carbon ring including —$(CH_2)_{n1}$— may be replaced

TABLE 3

| Dye symbol | $R^1$ | $R^4$ | $R^7$ | $R^8$ | $R^9$ | $R^{10}$ | $R^{11}$ | $R^{12}$ |
|---|---|---|---|---|---|---|---|---|
| (II-3-1) | —CH₃ | H | H | H | —CH₃ | H | —CH₃ | —CH₂—C(CH₃)₂ |
| (II-3-2) | —C₂H₅ | H | H | H | —CH₃ | H | —CH₃ | —CH₂—C(CH₃)₂ |
| (II-3-3) | -nC₃H₇ | H | H | H | —CH₃ | H | —CH₃ | —CH₂—C(CH₃)₂ |
| (II-3-4) | —CH(CH₃)₂ | H | H | H | —CH₃ | H | —CH₃ | —CH₂—C(CH₃)₂ |
| (II-3-5) | —CH₃ | H | H | H | —CH₃ | H | —CH₃ | —CH₃ |
| (II-3-6) | —C₂H₅ | H | H | H | —CH₃ | H | —CH₃ | —CH₃ |
| (II-3-7) | -nC₃H₇ | H | H | H | —CH₃ | H | —CH₃ | —CH₃ |
| (II-3-8) | —CH(CH₃)₂ | H | H | H | —CH₃ | H | —CH₃ | —CH₃ |
| (II-3-9) | —CH₃ | H | H | H | —CH₃ | H | —CH₃ | —C₂H₅ |
| (II-3-10) | —C₂H₅ | H | H | H | —CH₃ | H | —CH₃ | —C₂H₅ |
| (II-3-11) | -nC₃H₇ | H | H | H | —CH₃ | H | —CH₃ | —C₂H₅ |
| (II-3-12) | —CH(CH₃)₂ | H | H | H | —CH₃ | H | —CH₃ | —C₂H₅ |
| (II-3-13) | —CH₃ | H | H | H | —CH₃ | H | —CH₃ | -nC₃H₇ |
| (II-3-14) | —C₂H₅ | H | H | H | —CH₃ | H | —CH₃ | -nC₃H₇ |
| (II-3-15) | -nC₃H₇ | H | H | H | —CH₃ | H | —CH₃ | -nC₃H₇ |
| (II-3-16) | —CH(CH₃)₂ | H | H | H | —CH₃ | H | —CH₃ | -nC₃H₇ |

Among the above examples of the compound (II-3), the compounds (II-3-1) to (II-3-4) are preferable from the viewpoints of visible light transparency, solubility in the by a halogen atom, an alkyl group having a carbon number of 1 to 15 that may include a substituent, or an aryl group having a carbon number of 5 to 20.

The above-mentioned alkyl group (including an alkyl group included in an alkoxy group) may be linear and include a branch structure or a saturated ring structure. The term "aryl group" means a group that is connected via a carbon atom that is a member of an aromatic ring of an aromatic compound, such as a benzene ring, a naphthalene ring, a biphenyl ring, a furan ring, a thiophene ring, or a pyrrole ring. Examples of the substituent included in the alkyl group or alkoxy group (each of them has a carbon number of 1 to 15 and may include a substituent) or the aryl group having a carbon number of 5 to 20 include a halogen atom and an alkoxy group having a carbon number of 1 to 10.

In Formula (III), it is preferable that $R^{101}$ be an alkyl group having a carbon number of 1 to 15 or an aryl group having a carbon number of 5 to 20, even preferably an alkyl group having a carbon number of 1 to 15 that has a branch from the viewpoint of maintaining a high visible light transmittance in the resin.

In Formula (III), it is preferable that $R^{102}$ to $R^{105}$, $R^{108}$, and $R^{109}$ be, independently of each other, a hydrogen atom, an alkyl group or an alkoxy group (each of them has a carbon number of 1 to 15), or an aryl group having a carbon number of 5 to 20. A hydrogen atom is even preferable from the viewpoint that a high visible light transmittance can be obtained.

In Formula (III), it is preferable that $R^{110}$ to $R^{114}$ be, independently of each other, a hydrogen atom or an alkyl group having a carbon number of 1 to 15. A hydrogen atom is even preferable from the viewpoint that a high visible light transmittance can be obtained.

It is preferable that $R^{106}$ and $R^{107}$ be, independently of each other, a hydrogen atom, an alkyl group having a carbon number of 1 to 15, or an aryl group having a carbon number of 5 to 20 (it may include a straight chain, cyclic, or branched chain alkyl group), even preferably a hydrogen atom or an alkyl group having a carbon number of 1 to 15. It is preferable that $R^{106}$ and $R^{107}$ be the same group.

Examples of $X^-$ include $I^-$, $BF_4^-$, $PF_6^-$, $ClO_4^-$, and anions represented by the following Formulae (X1) and (X2), among which $BF_4^-$ and $PF_6^-$ are preferable.

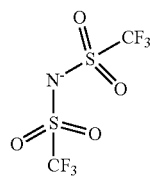
(X1)

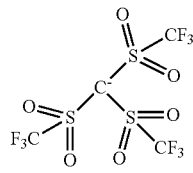
(X2)

In the following description, the portion of the dye (III) excluding $R^{101}$ to $R^{114}$ is also referred to as a framework (III).

A compound in which n1 in Formula (III) is 1 is represented by the following Formula (III-1) and a compound in which n1 in Formula (III) is 0 is represented by the following Formula (III-2).

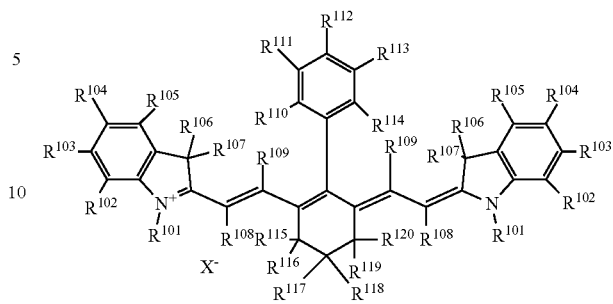
(III-1)

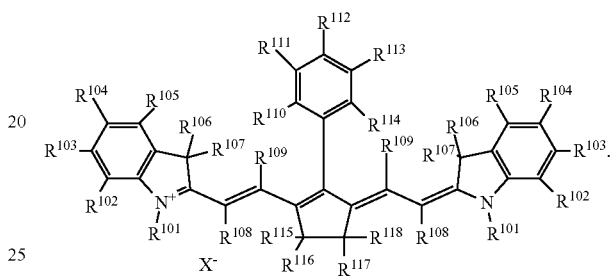
(III-2)

In Formulae (III-1) and (III-2), $R^{101}$ to $R^{114}$ and $X^-$ are the same as in Formula (III). $R^{115}$ to $R^{120}$ represent, independently of each other, a hydrogen atom, a halogen atom, an alkyl group or an alkoxy group (each of them has a carbon number of 1 to 15 and may include a substituent), or an aryl group having a carbon number of 5 to 20. It is preferable that $R^{115}$ to $R^{120}$ represent, independently of each other, a hydrogen atom, an alkyl group having a carbon number of 1 to 15, or an aryl group having a carbon number of 5 to 20 (it may include a straight chain, cyclic, or branched chain alkyl group), even preferably a hydrogen atom or an alkyl group having a carbon number of 1 to 15. It is preferable that $R^{115}$ to $R^{120}$ be the same group.

Particularly preferable examples of the compounds represented by Formula (III) include compounds represented by Formula (III-1).

More specific examples of the compounds represented by Formula (III-1) include compounds in each of which atoms or groups connected to the framework are atoms or groups shown in the following table. In all compounds shown in the following table, $R^{101}$ to $R^{109}$ located in the left portion of each formula are the same as those located in its right portion.

"$R^{110}$-$R^{104}$" in the following table represents atoms or groups that are connected to the central benzene ring in each formula. In the case where all five symbols represent a hydrogen atom, "H" is written. In the case where one of $R^{110}$ to $R^{114}$ is a substituent and the others are a hydrogen atom, only a combination of a symbol representing that substituent and the substituent is written. For example, an entry "$R^{112}$—$C(CH_3)_3$" means that $R^{112}$ is —$C(CH_3)_3$ and the others are a hydrogen atom.

"$R^{115}$-$R^{120}$" in Table 4 represents atoms or groups that are connected to the central cyclohexane ring in Formula (III-1). In the case where all six symbols represent a hydrogen atom, "H" is written. In the case where one of $R^{115}$ to $R^{120}$ is a substituent and the others are a hydrogen atom, only a combination of a symbol representing that substituent and the substituent is written.

TABLE 4

| Dye symbol | R$^{101}$ | R$^{102}$-R$^{105}$ | R$^{106}$ | R$^{107}$ | R$^{108}$ | R$^{109}$ | R$^{110}$-R$^{114}$ | R$^{115}$-R$^{120}$ | X$^-$ |
|---|---|---|---|---|---|---|---|---|---|
| (III-1-1) | —CH$_3$ | H | —CH$_3$ | —CH$_3$ | H | H | H | H | BF$_4^-$ |
| (III-1-2) | —C$_2$H$_5$ | H | —CH$_3$ | —CH$_3$ | H | H | H | H | BF$_4^-$ |
| (III-1-3) | -nC$_3$H$_7$ | H | —CH$_3$ | —CH$_3$ | H | H | H | H | BF$_4^-$ |
| (III-1-4) | —CH(CH$_3$)$_2$ | H | —CH$_3$ | —CH$_3$ | H | H | H | H | BF$_4^-$ |
| (III-1-5) | —CH$_3$ | H | —CH$_3$ | —CH$_3$ | H | H | H | H | PF$_6^-$ |
| (III-1-6) | —C$_2$H$_5$ | H | —CH$_3$ | —CH$_3$ | H | H | H | H | PF$_6^-$ |
| (III-1-7) | -nC$_3$H$_7$ | H | —CH$_3$ | —CH$_3$ | H | H | H | H | PF$_6^-$ |
| (III-1-8) | —CH(CH$_3$)$_2$ | H | —CH$_3$ | —CH$_3$ | H | H | H | H | PF$_6^-$ |
| (III-1-9) | —CH$_3$ | H | —CH$_3$ | —CH$_3$ | H | H | H | H | N(SO$_2$CF$_3$)$_2^-$ |
| (III-1-10) | —C$_2$H$_5$ | H | —CH$_3$ | —CH$_3$ | H | H | H | H | N(SO$_2$CF$_3$)$_2^-$ |
| (III-1-11) | -nC$_3$H$_7$ | H | —CH$_3$ | —CH$_3$ | H | H | H | H | N(SO$_2$CF$_3$)$_2^-$ |
| (III-1-12) | —CH(CH$_3$)$_2$ | H | —CH$_3$ | —CH$_3$ | H | H | H | H | N(SO$_2$CF$_3$)$_2^-$ |
| (III-1-13) | —CH$_3$ | H | —CH$_3$ | —CH$_3$ | H | H | H | H | ClO$_4^-$ |
| (III-1-14) | —C$_2$H$_5$ | H | —CH$_3$ | —CH$_3$ | H | H | H | H | ClO$_4^-$ |
| (III-1-15) | -nC$_3$H$_7$ | H | —CH$_3$ | —CH$_3$ | H | H | H | H | ClO$_4^-$ |
| (III-1-16) | —CH(CH$_3$)$_2$ | H | —CH$_3$ | —CH$_3$ | H | H | H | H | ClO$_4^-$ |
| (III-1-17) | —CH$_3$ | H | H | H | H | H | H | H | BF$_4^-$ |
| (III-1-18) | —C$_2$H$_5$ | H | H | H | H | H | H | H | BF$_4^-$ |
| (III-1-19) | -nC$_3$H$_7$ | H | H | H | H | H | H | H | BF$_4^-$ |
| (III-1-20) | —CH(CH$_3$)$_2$ | H | H | H | H | H | H | H | BF$_4^-$ |
| (III-1-21) | —CH$_3$ | H | H | H | H | H | H | H | PF$_6^-$ |
| (III-1-22) | —C$_2$H$_5$ | H | H | H | H | H | H | H | PF$_6^-$ |
| (III-1-23) | -nC$_3$H$_7$ | H | H | H | H | H | H | H | PF$_6^-$ |
| (III-1-24) | —CH(CH$_3$)$_2$ | H | H | H | H | H | H | H | PF$_6^-$ |
| (III-1-25) | —CH$_3$ | H | H | H | H | H | H | H | N(SO$_2$CF$_3$)$_2^-$ |
| (III-1-26) | —C$_2$H$_5$ | H | H | H | H | H | H | H | N(SO$_2$CF$_3$)$_2^-$ |
| (III-1-27) | -nC$_3$H$_7$ | H | H | H | H | H | H | H | N(SO$_2$CF$_3$)$_2^-$ |
| (III-1-28) | —CH(CH$_3$)$_2$ | H | H | H | H | H | H | H | N(SO$_2$CF$_3$)$_2^-$ |
| (III-1-29) | —CH$_3$ | H | H | H | H | H | H | H | ClO$_4^-$ |
| (III-1-30) | —C$_2$H$_5$ | H | H | H | H | H | H | H | ClO$_4^-$ |
| (III-1-31) | -nC$_3$H$_7$ | H | H | H | H | H | H | H | ClO$_4^-$ |
| (III-1-32) | —CH(CH$_3$)$_2$ | H | H | H | H | H | H | H | ClO$_4^-$ |

Among the examples of the compound (III-1), the compounds (III-1-1) to (III-1-12) are preferable from the viewpoints of visible light transparency, solubility in the resin, and durability. Among these examples, the compounds (III-1-2), (III-1-6), and (III-1-9) are even preferable from the viewpoints of visible light transparency and durability.

The dye (III) can be manufactured by, for example, methods described in "Dyes and Pigments," 73 (2007), pp. 344-352 and J. Heterocyclic Chem., 42, 959 (2005).

It is preferable that the content of the NIR dye (IR) in the resin film be 0.1 to 25 parts by mass, even preferably 0.3 to 15 parts by mass, with respect to the resin (100 parts by mass). In the case where two or more compounds are combined, the sum of the contents of the respective compounds should be in the above range.

In the case where the NIR dye (IR) contains the compounds (A) to (C), it is preferable that the content of each of the compounds (A) to (C) with respect to the resin (100 parts by mass) be 0.5 to 5 parts by mass.

<Uv Dye>

The dye (U) is a UV dye having a maximum absorption wavelength in a wavelength of 370 to 430 nm in the resin. The use of such a dye makes it possible to cut ultraviolet light effectively.

Examples of the dye (U) include an oxazole dye, a merocyanine dye, a cyanine dye, a naphthalimide dye, an oxadiazole dye, an oxazine dye, an oxazolidine dye, a naphthalic acid dye, a styryl dye, an anthracene dye, a cyclic carbonyl dye, and a triazole dye. Among these examples, the merocyanine dye is particularly preferable. Only one kind may be used singly or two or more kinds may be used in combination.

In particular, it is preferable to use, as the dye (U), a merocyanine dye represented by the following Formula (M).

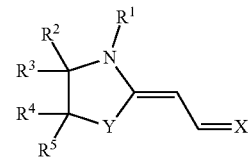

(M)

Symbols in the Formula (M) have the following meanings.

R$^1$ represents a monovalent hydrocarbon group having a carbon number of 1 to 12 that may include a substituent.

Preferable examples of the substituent include an alkoxy group, an acyl group, an acyloxy group, a cyano group, a dialkylamino group, and a chlorine atom. It is preferable that the carbon number of each of the alkoxy group, the acyl group, the acyloxy group and the dialkylamino group be 1 to 6.

Specific preferable examples of R$^1$ not having a substituent include an alkyl group having a carbon number of 1 to 12 in which part of the hydrogen atoms may be replaced by an aliphatic ring, an aromatic ring, or an alkenyl group, a cycloalkyl group having a carbon number of 3 to 8 in which part of the hydrogen atoms may be replaced by an aromatic ring, an alkyl group, or an alkenyl group, and an aryl group having a carbon number of 6 to 12 part of the hydrogen atoms may be replaced by an aliphatic ring, an alkyl group, or an alkenyl group.

In the case where R$^1$ represents an unsubstituted alkyl group, the alkyl group may be either linear or branched and its carbon number is preferably 1 to 6.

In the case where R$^1$ represents an alkyl group having a carbon number of 1 to 12 in which part of the hydrogen atoms are replaced by an aliphatic ring, an aromatic ring, or an alkenyl group, even preferable examples include an alkyl group having a carbon number of 1 to 4 that includes a cycloalkyl group having a carbon number of 3 to 6 and a phenyl group-replaced alkyl group having a carbon number of 1 to 4, particularly preferably a phenyl group-replaced alkyl group having a carbon number of 1 or 2. It is noted that the alkenyl group-replaced alkyl group means a group that is an alkenyl group as a whole but does not have an unsaturated bond between the positions 1 and 2, such as an aryl group and a 3-butenyl group.

It is preferable that $R^1$ be an alkyl group having a carbon number of 1 to 6 in which part of the hydrogen atoms may be replaced by a cycloalkyl group or a phenyl group. It is particularly preferable that $R^1$ be an alkyl group having a carbon number of 1 to 6, specific examples of which include a methyl group, an ethyl group, an n-propyl group, an isopropyl group, an n-butyl group, an isobutyl group, and a t-butyl group.

$R^2$ to $R^5$ represent, independently of each other, a hydrogen atom, a halogen atom, an alkyl group having a carbon number of 1 to 10, or an alkoxy group having a carbon number of 1 to 10. It is preferable that the carbon number of the alkyl group and the alkoxy group be 1 to 6, even preferably 1 to 4.

It is preferable that at least one of $R^2$ and $R^3$ be an alkyl group, and it is even preferable that both of them be an alkyl group. In the case where neither $R^2$ nor $R^3$ is an alkyl group, it is even preferable that they be a hydrogen atom. It is particularly preferable that each of $R^2$ and $R^3$ be an alkyl group having a carbon number of 1 to 6.

It is preferable that at least one of $R^4$ and $R^5$ be a hydrogen atom, and it is even preferable that both of them be a hydrogen atom. In the case where neither $R^4$ nor $R^5$ is a hydrogen atom, it is preferable that they be an alkyl group having a carbon number of 1 to 6.

Y represents a methylene group with substitution by $R^6$ and $R^7$ or an oxygen atom.

$R^6$ and $R^7$ represent, independently of each other, a hydrogen atom, a halogen atom, an alkyl group having a carbon number of 1 to 10, or an alkoxy group having a carbon number of 1 to 10.

X represents one of divalent groups represented by the following Formulae (X1) to (X5).

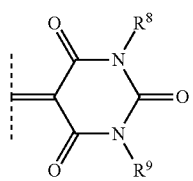
(X1)

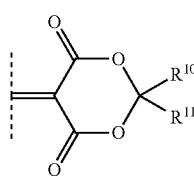
(X2)

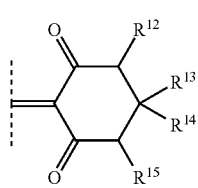
(X3)

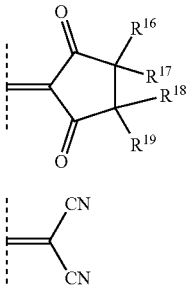
(X4)

(X5)

$R^8$ and $R^9$ represent, independently of each other, a monovalent hydrocarbon group having a carbon number of 1 to 12 that may include a substituent. $R^{10}$ to $R^{19}$ represent, independently of each other, a hydrogen atom or a monovalent hydrocarbon group having a carbon number of 1 to 12 that may include a substituent.

Examples of the substituent of $R^8$ to $R^{19}$ are the same as those of the substituent of $R^1$, and they also share preferable modes of implementation with $R^1$. In the case where $R^8$ to $R^{19}$ represent hydrocarbon groups not including a substituent, they share example modes of implementation with $R^1$ not including a substituent.

In Formula (X1), $R^8$ and $R^9$ may represent different groups but it is preferable that they represent the same group. In the case where each of $R^8$ and $R^9$ represents an unsubstituted alkyl group, it may be either linear or branched and preferably has a carbon number of 1 to 6.

It is preferable that both $R^8$ and $R^9$ be an alkyl group having a carbon number of 1 to 6 in which part of the hydrogen atoms may be replaced by a cycloalkyl group or a phenyl group. Particularly preferable examples of both $R^8$ and $R^9$ include an alkyl group having a carbon number of 1 to 6, specific examples of which include a methyl group, an ethyl group, an n-propyl group, an isopropyl group, an n-butyl group, an isobutyl group, and a t-butyl group.

In Formula (X2), it is even preferable that both $R^{10}$ and $R^{11}$ be an alkyl group having a carbon number of 1 to 6 and it is particularly preferable that they be the same alkyl group.

In Formula (X3), it is even preferable that both $R^{12}$ and $R^{15}$ be a hydrogen atom or an alkyl group having a carbon number of 1 to 6 that does not include a substituent. It is preferable that both $R^{13}$ and $R^{14}$ that are two groups connected to the same carbon atom be a hydrogen atom or an alkyl group having a carbon number of 1 to 6.

In Formula (X4), it is preferable that two groups $R^{16}$ and $R^{17}$ that are connected to the same carbon atom and two groups $R^{18}$ and $R^{19}$ that are connected to the same carbon atom all be a hydrogen atom or an alkyl group having a carbon number of 1 to 6.

The compound (M) can be manufactured by a known method.

It is preferable that the content of the UV dye (U) in the resin film be 0.1 to 15 parts by mass, even preferably 1 to 10 parts by mass, with respect to the resin (100 parts by mass). The UV dye (U) is not prone to lower the resin properties as long as its content is in this range.

<Substrate Structure>

The substrate of the present filter may have either a single-layer structure or a multilayer structure. There are no particular limitations on the material of the substrate; the material may be either an organic material or an inorganic material as long as it is a transparent material that transmits visible light in a wavelength of 400 to 700 nm.

In the case where the substrate has a single-layer structure, it is preferable that the substrate be a resin substrate that is a resin film containing a resin and the NIR dye (IR).

In the case where the substrate has a multilayer structure, it is preferable that the substrate be a composite substrate in which a resin film containing the NIR dye (TR) is laid on at least one major surface of a support body. In this case, it is preferable that the support body be made of a transparent resin or a transparent inorganic material.

There are no particular limitations on the resin as long as it is a transparent resin. One or more transparent resins selected from a polyester resin, an acrylic resin, an epoxy resin, an enethiol resin, a polycarbonate resin, a polyether resin, a polyarylate resin, a polysulfone resin, a polyether sulfone resin, a polyparaphenylene resin, a polyarylene ether phosphine oxide resin, a polyamide resin, a polyimide resin, a polyamideimide resin, a polyolefin resin, a cyclic olefin resin, a polyurethane resin, a polystyrene resin, etc. are used. One of these resins may be used singly and two or more them may be used in mixture.

One or more resins selected from a polyimide resin, a polycarbonate resin, a polyester resin, and an acrylic resin are preferable from the viewpoints of the spectroscopic characteristics, glass transition temperature (Tg), and adhesion of the resin film.

In the case where plural compounds are used as the NIR dye (IR) and other dyes, they may be contained in either the same resin film or respective, different resin films.

Preferable example of the transparent inorganic material include glass and a crystal material.

Examples of glass that can be used as the support body include an absorption glass (near-infrared light absorption glass) in which copper ions are contained in a fluorophosphate glass, a phosphate glass, or the like, a soda-lime glass, a borosilicate glass, an alkali-free glass, and a quartz glass.

Preferable examples of the glass include a phosphate glass and a fluorophosphate glass from the viewpoint of the ability to absorb infrared light (in particular, in a wavelength of 900 to 1,200 nm). The term "phosphate glass" includes a silicophosphate glass in which part of the glass framework is constituted by $SiO_2$.

A chemically strengthened glass obtained by replacing alkali metal ions having a small ion radius (e.g., Li ions and/or Na ions) that exist adjacent to a major surface of a glass plate with alkali ions having a larger ion radius (e.g., Na ions or K ions for Li ions and K ions for Na ions) by ion exchange at a temperature that is lower than or equal to a glass transition temperature may be used as the glass.

Examples of crystal materials that can be used to form the support body include birefringent crystals such as quartz, lithium niobate, and sapphire.

From the viewpoints of the shape stability that relates to the long-term reliability of optical characteristics, mechanical properties, etc. and the ease of handling during filter manufacture, it is preferable that the support body be made of an inorganic material, particularly preferably glass or sapphire.

A resin film can be formed by preparing a coating liquid by dissolving or dispersing, in a solvent, the dye (IR), a resin or resin material components, and components that are mixed when necessary, applying it to the support body and drying it, and, if necessary, curing it. The support body may be either one included in the present filter or a peelable one that is used only in forming the resin film. It suffices that the solvent be a dispersion medium that enables stable dispersion or a solvent capable of dissolution.

The coating liquid may contain a surfactant to improve voids formed by minute babbles, depressions due to sticking of foreign substances etc., and cissing in a drying step, and other things. The coating liquid can be applied by, for example, an immersion coating method, a cast coating method, or spin coating method. The resin film is formed by applying the above-mentioned coating liquid to the support body and then drying it. In the case where the coating liquid contains material components of a transparent resin, curing treatment such as thermal curing or photocuring is performed further.

The resin film can also be manufactured so as to have a film shape by extrusion molding. In the case where the substrate has a single-layer structure that is made up of a resin film containing the dye (IR) (resin substrate), the resin film itself can be used as the substrate. In the case where the substrate has a multilayer structure containing the support body and a resin film containing the dye (IR) and laid on at least one major surface of the support body (composite substrate), the substrate can be manufactured by laying such a film on the support body and integrating it with the support body by, for example, thermocompression bonding.

The optical filter may have either one resin film (layer) or two or more resin films (layers). In the case where the optical filter has two or more resin films, the resin films may have either the same structure or different structures.

In the case where the substrate has a single-layer structure that is made up of a resin film containing the dye (IR) (resin substrate), it is preferable that the thickness of the resin film be 20 to 150 μm.

In the case where the substrate has a multilayer structure containing the support body and a resin film containing the dye (IR) and laid on at least one major surface of the support body (composite substrate), it is preferable that the thickness of the resin film be 0.3 to 20 μm. In the case where the optical filter has resin films in the form of two or more layers, it is preferable that the total thickness of the resin films be in the above range.

There are no particular limitations on the shape of the substrate; it may have a block shape, a plate shape, or a film shape.

Furthermore, from the viewpoints of reduction of a warp that may occur at the time of formation of a dielectric multilayer film and height reduction of an optical device, it is preferable that the thickness of the substrate be 300 μm or smaller. In the case where the substrate is a resin substrate that is made up of a resin film, it is preferable that the thickness of the substrate be 50 to 300 μm. In the case where the substrate is a composite substrate including the support body and a resin film, it is preferable that the thickness of the substrate be 50 to 300 μm.

For example, the present filter may be equipped with, as another constituent element, a constituent element (layer) that gives absorption by, for example, inorganic fine particles for controlling the transmission and absorption of light in a particular wavelength range. Specific examples of the inorganic fine particles include ITO (indium tin oxide), ATO (antimony-doped tin oxide), cesium tungstate, and lanthanum boride. ITO fine particles and cesium tungstate fine particles are high in visible light transmittance and light-absorptive in a wide infrared wavelength that is longer than 1,200 nm, and hence can be used in a case of requiring blocking of such infrared light.

EXAMPLES

Next, the present invention will be described in more detail using Examples.

An ultraviolet/visible spectrophotometer (type "UH-4150" produced by Hitachi High-Tech Corporation) was used for measurement of various spectroscopic characteristics.

It is noted that values of spectroscopic characteristics for which no particular incident angle is specified are values that were measured at an incident angle of 0° (i.e., from a direction that is perpendicular to the major surface of an optical filter).

Dyes used in each Example are as follows:

Compound 1 (squarylium dye): synthesized on the basis of U.S. Pat. No. 5,543,086B;

Compound 2 (squarylium dye): synthesized on the basis of WO2017/135359;

Compound 3 (cyanine dye): synthesized on the basis of "Dyes and Pigments, 73 (2007), pp. 344-352";

Compound 4 (cyanine dye): synthesized on the basis of "Dyes and Pigments, 73 (2007), pp. 344-352";

Compound 5 (diimmonium dye): synthesized on the basis of JP2014-25016A;

Compound 6 (squarylium dye): synthesized on the basis of WO2019/230660;

Compound 7 (merocyanine compound): synthesized using JP6504176B as a reference;

Compound 8 (merocyanine compound): synthesized using JP6504176B as a reference;

Compound 9 (squarylium dye): synthesized on the basis of US2014/0061505 and WO2014/088063;

Compound 10 (cyanine dye): synthesized on the basis of "Dyes and Pigments, 73 (2007), pp. 344-352".

Compound 1

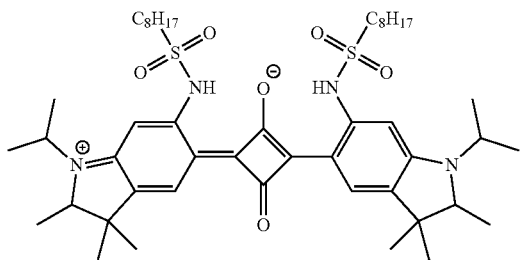

Compound 2

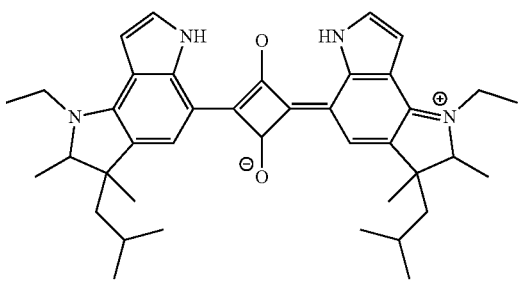

Compound 3

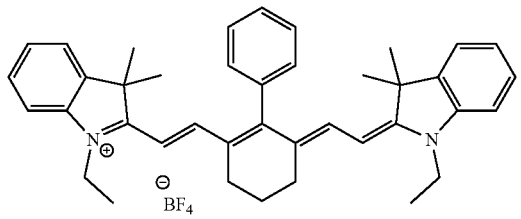

Compound 4

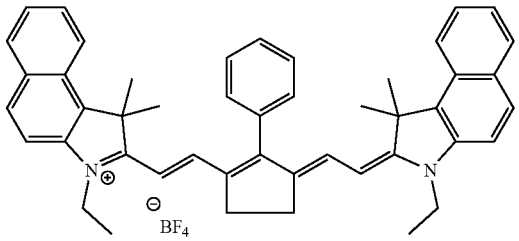

Compound 5

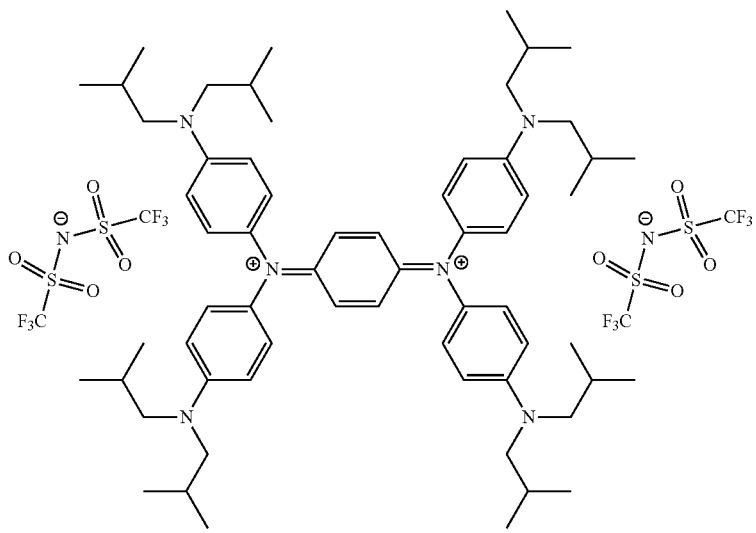

-continued

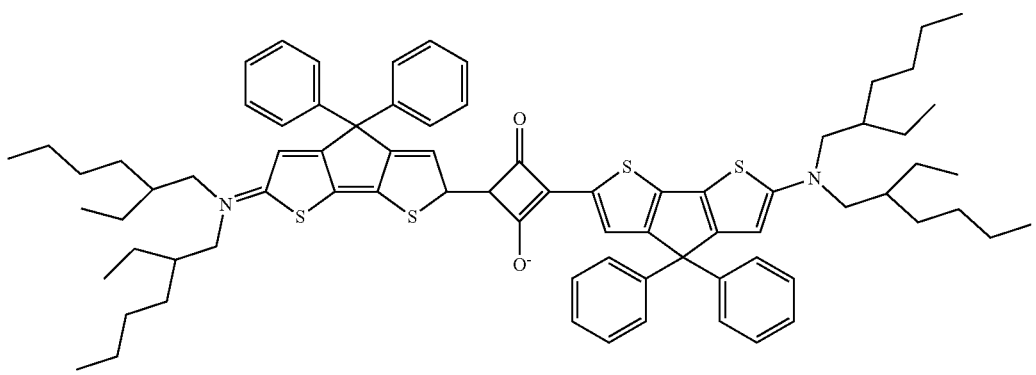

Compound 6

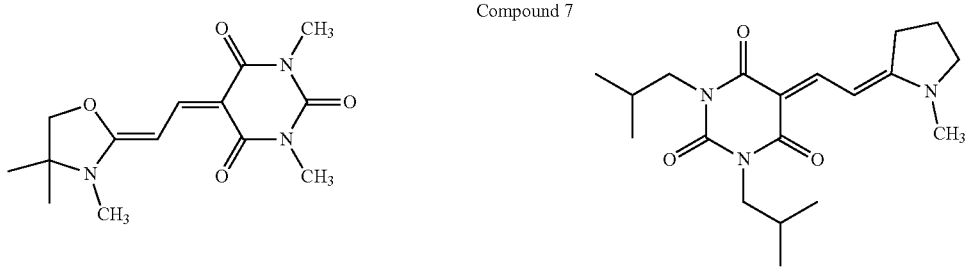

Compound 7    Compound 8

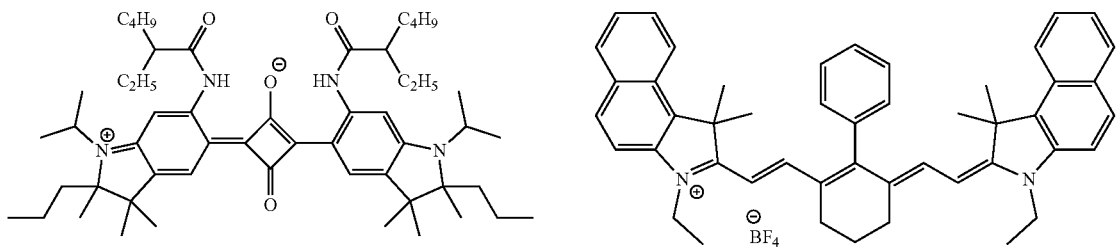

Compound 9    Compound 10

<Spectroscopic Characteristics of Dye>

A polyimide resin ("C-3G30G" produced by Mitsubishi Gas Chemical Company, Inc.) was dissolved in an organic solvent (cyclohexane and γ-butyrolactone (mass ratio: 1:1)) at a concentration of 8.5 mass %.

Each dye compound shown in the following table was added to the thus-prepared polyimide resin solution so as to obtain a concentration of 7.5 parts by mass with respect to the resin (100 parts by mass) and stirring was performed for 2 hours while heating was made to 50° C. Each dye-containing resin solution was applied to a glass substrate (alkali glass "D263" produced by Schott AG) by spin coating and dried, whereby a 2 μm-thick resin film (coated film) was obtained.

A transmittance spectrum and a reflection spectrum of each resin film were measured by a spectrophotometer in a wavelength of 350 to 1,200 nm at an incident angle of 5°. A spectroscopic internal transmission curve was calculated using the measured spectroscopic transmittance curve and spectroscopic reflectance curve and then normalized so that a transmittance at a maximum absorption wavelength became 10%.

Spectroscopic characteristics are shown in the following table.

TABLE 5

| Compound | NIR dye | | | | | | UV dye | | NIR dye | |
|---|---|---|---|---|---|---|---|---|---|---|
|  | 1 | 2 | 3 | 4 | 5 | 6 | 7 | 8 | 9 | 10 |
| Maximum absorption wavelength (nm) (in polyimide resin) | 706 | 753 | 773 | 845 | 1,100 | 929 | 397 | 414 | 722 | 811 |
| Average internal transmittance $T_{440-490AVE}$ (%) | 98 | 97 | 96 | 92 | 83 | 92 | 99 | 98 | 97 | 93 |
| Average internal transmittance $T_{490-560AVE}$ (%) | 99 | 99 | 99 | 96 | 87 | 89 | 100 | 100 | 100 | 98 |
| Average internal transmittance $T_{560-590AVE}$ (%) | 97 | 98 | 96 | 98 | 89 | 88 | 100 | 100 | 99 | 97 |

Examples 1-1 to 1-12: Spectroscopic Characteristics of Resin Film

A polyimide resin ("C-3G30G" produced by Mitsubishi Gas Chemical Company, Inc.) was dissolved in an organic solvent (cyclohexane and γ-butyrolactone (mass ratio: 1:1)) at a concentration of 8.5 mass %.

Each compound was added to the thus-prepared polyimide resin solution so as to obtain a content (parts by mass) shown in the following table with respect to the resin (100 parts by mass) and stirring was performed for 2 hours while heating was made to 50° C. Each dye-containing resin solution was applied to a glass substrate (alkali glass "D263" produced by Schott AG) by spin coating and dried, whereby a 2 μm-thick resin film (coated film) was obtained.

A transmittance spectrum and a reflection spectrum of each resin film were measured by the spectrophotometer in a wavelength of 350 to 1,200 nm at an incident angle of 5°.

Spectroscopic characteristics are shown in the following table.

It is noted that Examples 1-1 to 1-12 are Referential Examples.

TABLE 6

| | | | | | | | | | Example | | | | | | |
|---|---|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-11 | 1-12 |
| | Resin film | | 1 | 2 | 3 | 4 | 5 | 6 | 7 | 8 | 9 | 10 | 11 | 12 |
| NIR dye (parts by mass) | Compound 1 | $\lambda_{MAX}$: 706 nm | 4.3 | 3.7 | 1.9 | 3.1 | 1.4 | — | 3.9 | 4.1 | 4.1 | 3.9 | 1.7 | 1.4 |
| | Compound 2 | $\lambda_{MAX}$: 753 nm | — | 1.8 | 1.8 | 0.2 | 2.9 | 7.6 | 0.9 | — | — | 0.9 | 2.0 | 2.9 |
| | Compound 3 | $\lambda_{MAX}$: 773 nm | — | — | 2.7 | 1.8 | — | — | — | — | — | — | 1.7 | — |
| | Compound 4 | $\lambda_{MAX}$: 845 nm | — | — | — | — | — | — | 1.8 | — | — | — | — | — |
| | Compound 5 | $\lambda_{MAX}$: 1100 nm | — | — | — | — | — | — | — | — | 5.0 | — | — | — |
| | Compound 6 | $\lambda_{MAX}$: 929 nm | — | — | — | — | — | — | — | — | 2.8 | — | — | — |
| UV dye (parts by mass) | Compound 7 | $\lambda_{MAX}$: 397 nm | 2.0 | 2.0 | 2.0 | 2.0 | 2.0 | 2.0 | 2.0 | 2.0 | 2.0 | 2.0 | 2.0 | 2.0 |
| | Compound 8 | $\lambda_{MAX}$: 414 nm | 2.4 | 2.4 | 2.4 | 2.4 | 2.4 | 2.4 | 2.4 | 2.4 | 2.4 | 2.4 | 2.4 | 2.4 |
| NIR dye (parts by mass) | Compound 9 | $\lambda_{MAX}$: 722 nm | — | — | — | — | 2.9 | 2.9 | — | — | — | — | — | 2.9 |
| | Compound 10 | $\lambda_{MAX}$: 811 nm | — | — | — | — | — | — | — | — | — | 2.7 | 1.3 | — |
| Internal transmittance of resin film (%) | $T_{440-490AVE}$ | | 92.6 | 90.9 | 85.0 | 89.4 | 87.4 | 83.3 | 87.2 | 84.0 | 86.4 | 83.3 | 86.7 | 86.4 |
| | $T_{490-560AVE}$ | | 97.9 | 97.4 | 95.1 | 96.7 | 97.2 | 95.9 | 94.9 | 91.1 | 88.8 | 94.4 | 96.2 | 95.3 |
| | $T_{560-590AVE}$ | | 92.9 | 92.5 | 86.7 | 90.5 | 93.2 | 92.0 | 92.1 | 87.8 | 83.6 | 89.6 | 90.5 | 84.5 |
| | $T_{700-760MAX}$ | | 91.8 | 14.5 | 2.5 | 14.2 | 3.3 | 1.6 | 48.4 | 76.5 | 79.3 | 20.3 | 1.7 | 0.5 |
| | $T_{760-800MAX}$ | | 99.7 | 89.1 | 9.0 | 29.7 | 83.0 | 62.4 | 48.4 | 79.9 | 81.5 | 20.2 | 28.4 | 10.4 |
| | $T_{800-900MAX}$ | | 99.8 | 99.6 | 99.2 | 99.4 | 99.7 | 99.8 | 81.3 | 76.8 | 73.4 | 97.1 | 99.4 | 11.7 |
| | $T_{900-1100MAX}$ | | 99.7 | 99.7 | 99.7 | 99.7 | 99.7 | 99.7 | 99.7 | 51.8 | 98.5 | 99.4 | 99.7 | 27.4 |

In the resin films of Examples 1-3, 1-5, 1-11, and 1-12 in each of which three NIR dyes whose maximum absorption wavelengths were in a wavelength of 680 to 800 nm were used in a well-balanced manner, the transparency in a visible range was high and the light blocking ability in a wavelength of 700 to 760 nm was high. It can be said that to maintain transparency in a visible range while attaining light blocking ability in the wide wavelength of 700 to 760 nm it is preferable to use three or more NIR dyes whose maximum absorption wavelengths are in the wavelength of 680 to 800 nm in a well-balanced manner.

The transparency in a visible range was low in the resin films of Examples 1-7, 1-8, 1-9, and 1-10 that employed two NIR dyes whose maximum absorption wavelengths were in the wavelength of 680 to 800 nm and one NIR dye whose maximum absorption wavelength was in a wavelength of 800 nm or longer.

The transparency in a visible range was low in Example 1-6 in which only one NIR dye was used and its addition amount was set high to achieve light blocking ability.

Examples 2-1 and 2-2: Spectroscopic Characteristics of Dielectric Multilayer Film Reflection layers were designed each of which was made up of a dielectric multilayer film 1 or 2 formed by laying $TiO_2$ films and $SiO_2$ films alternately. The numbers of layers, a thickness, and spectroscopic characteristics are shown in the following table.

Figure 5:
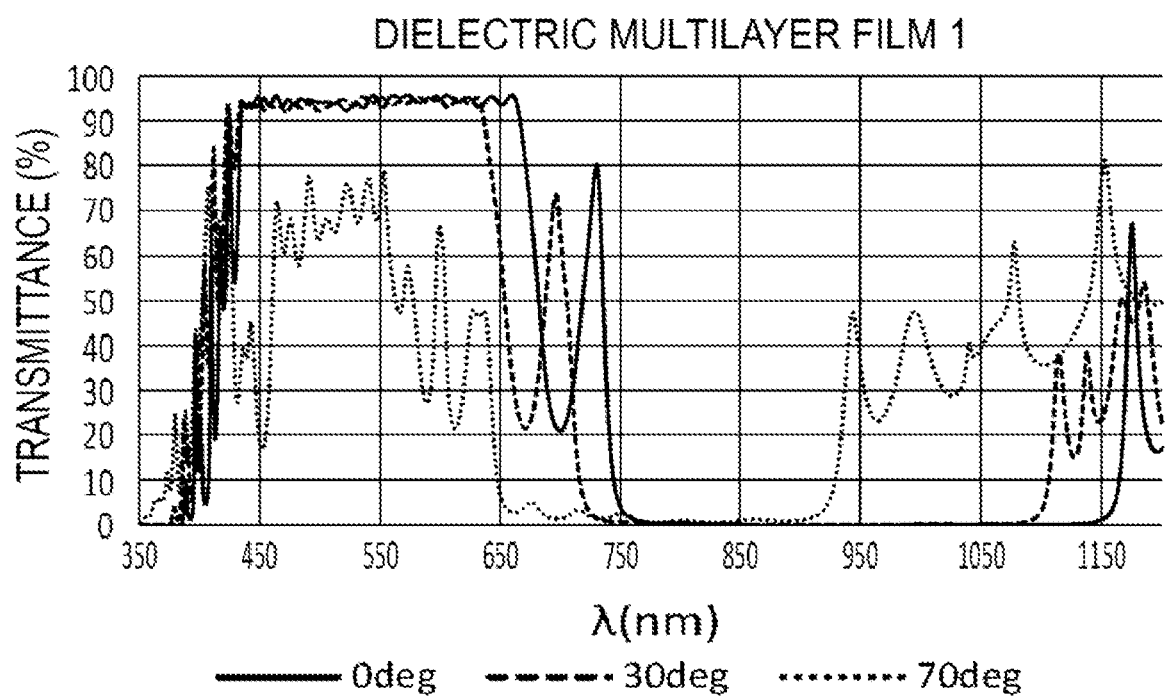
FIG. 5 is a graph showing a spectral transmittance curve of a dielectric multilayer film 1 of Example 2-1.
Figure 6:
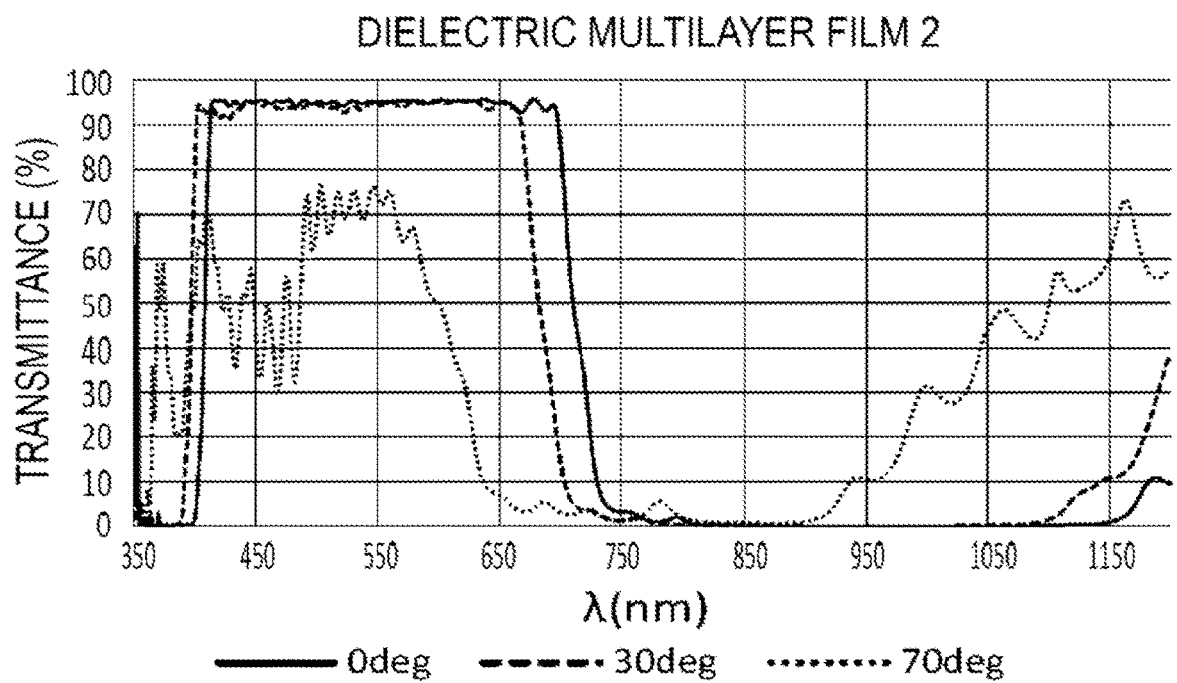
FIG. 6 is a graph showing a spectral transmittance curve of a dielectric multilayer film 2 of Example 2-2.

Spectral transmittance curves of the dielectric multilayer film 1 and the dielectric multilayer film 2 are shown in FIGS. 5 and 6, respectively.

It is noted that Examples 2-1 and 2-2 are Referential Examples.

TABLE 7

|  | | Number of layers | Materials | Thickness | Spectroscopic characteristic | 0 deg | 30 deg | 70 deg |
|---|---|---|---|---|---|---|---|---|
| Example 2-1 | Dielectric multilayer film 1 | 40 layers | 20 SiO$_2$ layers/ 20 TiO$_2$ layers | 4,944 nm | $T_{440-490AVE}$ (%) | 94.1 | 93.3 | 50.0 |
| | | | | | $T_{490-560AVE}$ (%) | 93.9 | 94.0 | 69.8 |
| | | | | | $T_{560-590AVE}$ (%) | 95.0 | 94.3 | 44.8 |
| | | | | | $T_{700-760MAX}$ (%) | 80.2 | 63.6 | 3.3 |
| | | | | | $T_{750}$ (%) | 3.8 | 0.6 | 2.7 |
| | | | | | $T_{760-80MAX}$ (%) | 1.3 | 0.6 | 1.4 |
| | | | | | $T_{800-900MAX}$ (%) | 0.5 | 0.3 | 1.2 |
| | | | | | $T_{900-1100MAX}$ (%) | 0.2 | 3.1 | 63.3 |
| | | | | | IR50 (nm) | 681 | 653 | 562 |
| | | | | | UV50 (nm) | 416 | 409 | 402 |
| Example 2-2 | Dielectric multilayer film 2 | 42 layers | 21 SiO$_2$ layers/ 21 TiO$_2$ layers | 4,950 nm | $T_{440-490AVE}$ (%) | 95.1 | 94.2 | 45.2 |
| | | | | | $T_{490-560AVE}$ (%) | 94.9 | 94.1 | 71.5 |
| | | | | | $T_{560-590AVE}$ (%) | 95.3 | 94.7 | 65.2 |
| | | | | | $T_{700-760MAX}$ (%) | 85.4 | 14.1 | 3.5 |
| | | | | | $T_{750}$ (%) | 3.2 | 1.2 | 1.1 |
| | | | | | $T_{760-800MAX}$ (%) | 2.8 | 1.8 | 5.6 |
| | | | | | $T_{800-900MAX}$ (%) | 1.4 | 0.3 | 1.9 |
| | | | | | $T_{900-1100MAX}$ (%) | 0.1 | 1.4 | 49.2 |
| | | | | | IR50 (nm) | 704 | 682 | 600 |
| | | | | | UV50 (nm) | 408 | 396 | 399 |

Example 3-1: Spectroscopic Characteristics of Optical Filter

An optical filter was obtained by laying, in this order, the dielectric multilayer film 1 produced in Example 2-1, a glass substrate (alkali glass "D263" produced by Schott AG), the resin film of Example 1-1, and a 7-layer antireflection film produced by evaporating SiO$_2$ and TiO$_2$ alternately.

Transmission spectra of the thus-obtained optical filter were measured from incident directions of 0°, 30°, and 70° using a spectrophotometer.

To evaluate flare and ghost, an optical filter disposed on a sensor of a digital camera on the market ("Cyber Shot DSC-HX5" produced by Sony Corporation) was removed and the optical filter produced in Example 3-1 was disposed instead. Whether flare and ghost light occurred was checked visually by performing shooting a white light source (tungsten-type halogen light source) at a shutter speed of 15 sec through bandpass filters (750±20 nm, 800±20 nm, 850±20 nm, and 900±5 nm). Whether flare and ghost light occurred was also checked visually by removing the bandpass filter and performing shooting a white light (all light) at a shutter speed of 0.25 sec.

An evaluation result was expressed by "A" in the case where flare and/or ghost were not observed visually, "B" in the case where flare and/or ghost were observed visually, and "C" in the case where particularly clear flare and/or ghost were observed visually.

Examples 3-2 to 3-11

Each optical filter was obtained in the same manner as in Example 3-1 except that a resin film shown in the following table was used.

Example 3-12

An optical filter was obtained in the same manner as in Example 3-1 except that a fluorophosphate glass ("NF50T" produced by AGC Inc.) was used as a glass substrate and a resin film shown in the following table was used.

Example 3-13

An optical filter was obtained in the same manner as in Example 3-1 except that the dielectric multilayer film 2 produced in Example 2-2 was used in place of the dielectric multilayer film 1.

Spectroscopic characteristics and evaluation results of flare and/or ghost are shown in the following table.

Figure 7:
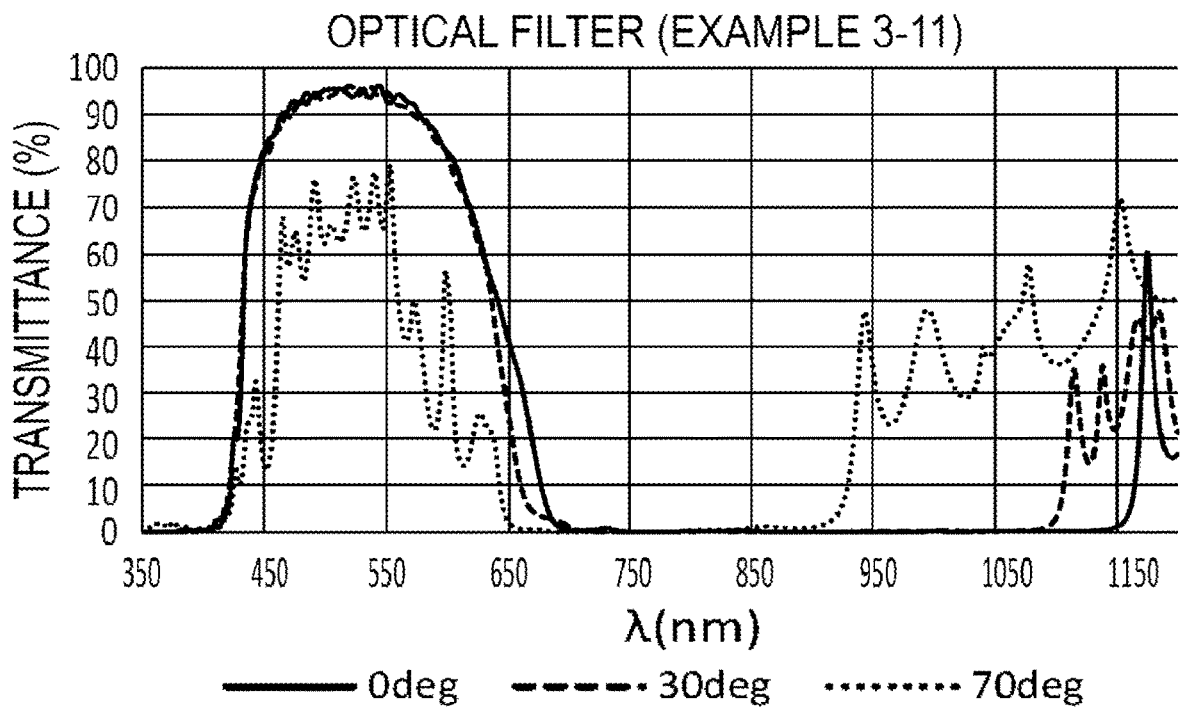
FIG. 7 is a graph showing a spectral transmittance curve of an optical filter of Example 3-11.
Figure 8:
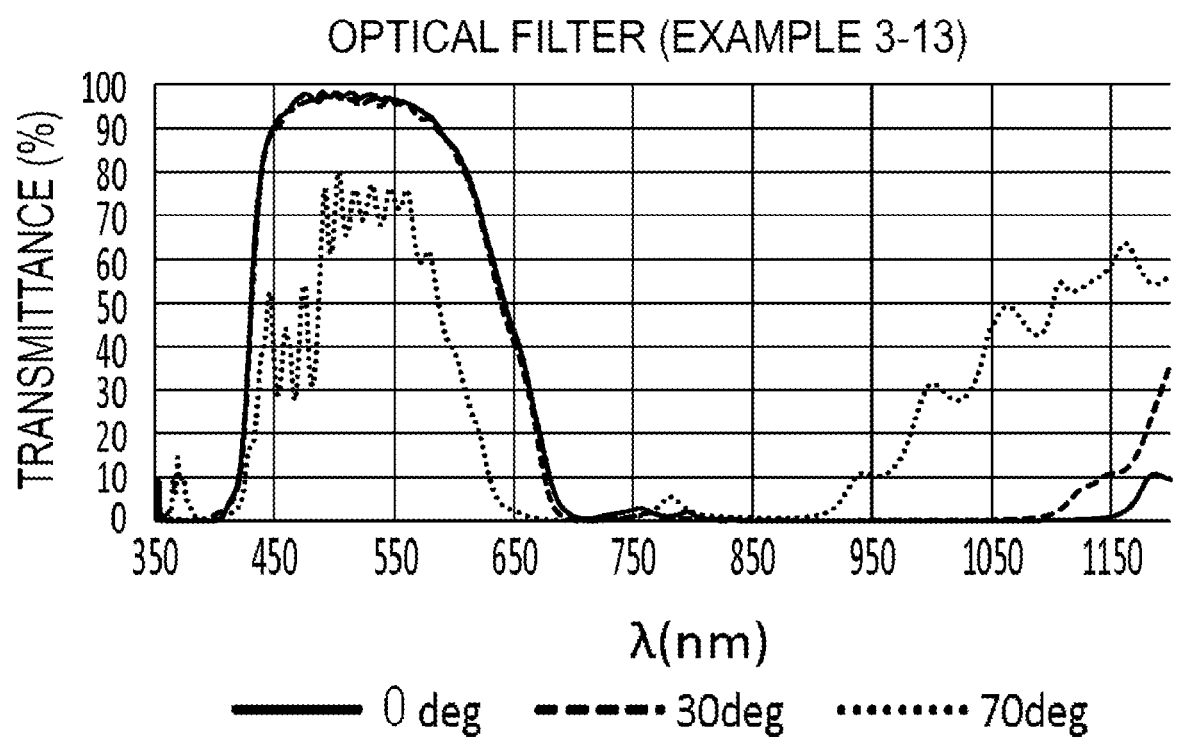
FIG. 8 is a graph showing a spectral transmittance curve of an optical filter of Example 3-13.

Spectral transmittance curves of the optical filters of Examples 3-11 and 3-13 are shown in FIGS. 7 and 8, respectively.

It is noted that Examples 3-3, 3-5, 3-11, and 3-12 are Inventive Examples and Examples 3-1, 3-2, 3-4, 3-6 to 3-10, and 3-13 are Comparative Examples.

TABLE 8

| | | Ex. 3-1 | Ex. 3-2 | Ex. 3-3 | Ex. 3-4 | Ex. 3-5 | Ex. 3-6 | Ex. 3-7 |
|---|---|---|---|---|---|---|---|---|
| Configuration | Resin film | 1 | 2 | 3 | 4 | 5 | 6 | 7 |
| | Glass | Alkali | Alkali | Alkali | Alkali | Alkali | Alkali | Alkali |
| | Multilayer film | 1 | 1 | 1 | 1 | 1 | 1 | 1 |
| Spectroscopic characteristics (0 deg) of optical filter | $T_{440-490AVE}$ (%) | 92.6 | 91.1 | 87.1 | 90.0 | 88.1 | 84.4 | 87.7 |
| | $T_{490-560AVE}$ (%) | 96.0 | 95.6 | 94.0 | 95.0 | 95.4 | 94.3 | 93.4 |
| | $T_{560-590AVE}$ (%) | 92.7 | 92.3 | 88.9 | 90.5 | 92.8 | 91.8 | 91.9 |
| | $T_{700-760MAX}$ (%) | 14.6 | 4.7 | 1.8 | 7.0 | 0.3 | 0.4 | 11.1 |
| | $T_{750}$ (%) | 2.9 | 0.4 | 0.0 | 0.5 | 0.1 | 0.0 | 1.7 |
| | $T_{760-800MAX}$ (%) | 1.2 | 0.5 | 0.1 | 0.2 | 0.5 | 0.3 | 0.6 |
| | $T_{800-900MAX}$ (%) | 0.5 | 0.5 | 0.3 | 0.3 | 0.5 | 0.4 | 0.2 |
| | $T_{900-1100MAX}$ (%) | 0.2 | 0.2 | 0.2 | 0.2 | 0.2 | 0.2 | 0.2 |
| | IR50 (nm) | 642 | 642 | 638 | 640 | 644 | 644 | 642 |
| | UV50 (nm) | 433 | 433 | 434 | 433 | 433 | 434 | 433 |

TABLE 8-continued

| Spectroscopic characteristics (30 deg) of optical filter | $T_{440-490AVE}$ (%) | 91.8 | 90.2 | 86.0 | 89.0 | 87.1 | 83.2 | 86.6 |
|---|---|---|---|---|---|---|---|---|
| | $T_{490-560AVE}$ (%) | 96.0 | 95.5 | 93.9 | 94.9 | 95.4 | 94.2 | 93.3 |
| | $T_{560-590AVE}$ (%) | 91.6 | 91.3 | 87.8 | 89.4 | 91.8 | 90.8 | 90.9 |
| | $T_{700-760MAX}$ (%) | 0.6 | 0.6 | 1.2 | 0.8 | 0.6 | 0.9 | 0.6 |
| | $T_{750}$ (%) | 0.4 | 0.1 | 0.0 | 0.1 | 0.0 | 0.0 | 0.2 |
| | $T_{760-800MAX}$ (%) | 0.6 | 0.3 | 0.0 | 0.1 | 0.2 | 0.2 | 0.3 |
| | $T_{800-900MAX}$ (%) | 0.3 | 0.3 | 0.1 | 0.2 | 0.3 | 0.2 | 0.1 |
| | $T_{900-1100MAX}$ (%) | 3.1 | 3.1 | 3.1 | 3.1 | 3.1 | 3.1 | 3.1 |
| | IR50 (nm) | 636 | 637 | 634 | 635 | 638 | 638 | 636 |
| | UV50 (nm) | 432 | 432 | 433 | 432 | 432 | 433 | 432 |
| Shift amount | IR50 (0 deg/30 deg) | 5.5 | 5.7 | 3.6 | 4.4 | 6.2 | 6.2 | 5.7 |
| | UV50 (0 deg/30 deg) | 1.2 | 1.2 | 0.9 | 1.1 | 1.0 | 0.9 | 1.0 |
| Spectroscopic characteristics (70 deg) of optical filter | $T_{700-760MAX}$ (%) | 2.0 | 0.2 | 0.0 | 0.2 | 0.0 | 0.0 | 1.0 |
| | $T_{750}$ (%) | 1.9 | 0.2 | 0.0 | 0.2 | 0.0 | 0.0 | 1.0 |
| | $T_{760-800MAX}$ (%) | 1.2 | 0.8 | 0.1 | 0.2 | 0.7 | 0.5 | 0.5 |
| | $T_{800-900MAX}$ (%) | 1.2 | 1.2 | 1.2 | 1.2 | 1.2 | 1.2 | 0.8 |
| | $T_{900-1100MAX}$ (%) | 58.0 | 57.2 | 58.1 | 58.2 | 58.2 | 57.1 | 57.2 |
| Flare/ghost evaluation | 750 ± 20 | C | C | B | C | A | A | C |
| | 800 ± 20 | B | A | A | A | A | A | A |
| | 850 ± 20 | A | A | A | A | A | A | A |
| | 900 ± 5 | A | A | A | A | A | A | A |
| | All light | C | B | A | B | A | A | B |

| | | Ex. 3-8 | E.x. 3-9 | Ex. 3-10 | Ex. 3-11 | Ex. 3-12 | Ex. 3-13 |
|---|---|---|---|---|---|---|---|
| Configuration | Resin film | 8 | 9 | 10 | 11 | 5 | 1 |
| | Glass | Alkali | Alkali | Alkali | Alkali | Fluorophosphate | Alkali |
| | Multilayer film | 1 | 1 | 1 | 1 | 1 | 2 |
| Spectroscopic characteristics (0 deg) of optical filter | $T_{440-490AVE}$ (%) | 85.0 | 86.8 | 84.3 | 87.6 | 87.4 | 93.8 |
| | $T_{490-560AVE}$ (%) | 90.0 | 87.8 | 93.0 | 94.6 | 93.7 | 97.2 |
| | $T_{560-590AVE}$ (%) | 87.9 | 84.1 | 89.6 | 90.5 | 85.0 | 93.1 |
| | $T_{700-760MAX}$ (%) | 13.5 | 14.0 | 4.7 | 0.9 | 0.1 | 2.8 |
| | $T_{750}$ (%) | 2.5 | 2.6 | 0.7 | 0.0 | 0.0 | 2.4 |
| | $T_{760-800MAX}$ (%) | 1.0 | 1.0 | 0.3 | 0.2 | 0.1 | 2.6 |
| | $T_{800-900MAX}$ (%) | 0.4 | 0.4 | 0.1 | 0.3 | 0.1 | 1.4 |
| | $T_{900-1100MAX}$ (%) | 0.1 | 0.2 | 0.2 | 0.2 | 0.0 | 0.1 |
| | IR50 (nm) | 640 | 640 | 634 | 641 | 624 | 642 |
| | UV50 (nm) | 434 | 433 | 434 | 433 | 433 | 431 |
| Spectroscopic characteristics (30 deg) of optical filter | $T_{440-490AVE}$ (%) | 83.8 | 85.7 | 83.2 | 86.5 | 86.4 | 92.7 |
| | $T_{490-560AVE}$ (%) | 89.7 | 87.4 | 92.9 | 94.5 | 93.6 | 96.2 |
| | $T_{560-590AVE}$ (%) | 86.7 | 82.7 | 88.4 | 89.3 | 83.5 | 92.0 |
| | $T_{700-760MAX}$ (%) | 0.6 | 0.6 | 0.4 | 1.0 | 0.2 | 1.5 |
| | $T_{750}$ (%) | 0.4 | 0.4 | 0.1 | 0.0 | 0.0 | 0.9 |
| | $T_{760-800MAX}$ (%) | 0.5 | 0.5 | 0.1 | 0.1 | 0.0 | 1.7 |
| | $T_{800-900MAX}$ (%) | 0.2 | 0.2 | 0.0 | 0.2 | 0.0 | 0.3 |
| | $T_{900-1100MAX}$ (%) | 0.8 | 3.0 | 3.0 | 3.1 | 0.7 | 1.4 |
| | IR50 (nm) | 635 | 636 | 633 | 636 | 621 | 639 |
| | UV50 (nm) | 433 | 432 | 433 | 433 | 433 | 431 |
| Shift amount | IR50 (0 deg/30 deg) | 4.5 | 4.9 | 1.2 | 5.1 | 2.6 | 3.2 |
| | UV50 (0 deg/30 deg) | 0.5 | 1.0 | 0.8 | 0.9 | 0.9 | −0.5 |
| Spectroscopic characteristics (70 deg) of optical filter | $T_{700-760MAX}$ (%) | 1.6 | 1.7 | 0.3 | 0.0 | 0.0 | 1.3 |
| | $T_{750}$ (%) | 1.6 | 1.6 | 0.3 | 0.0 | 0.0 | 0.8 |
| | $T_{760-800MAX}$ (%) | 1.0 | 1.0 | 0.2 | 0.2 | 0.1 | 5.4 |
| | $T_{800-900MAX}$ (%) | 0.7 | 0.6 | 1.0 | 1.2 | 0.1 | 1.9 |
| | $T_{900-1100MAX}$ (%) | 16.6 | 56.9 | 56.9 | 57.8 | 10.1 | 49.2 |
| Flare/ghost evaluation | 750 ± 20 | C | C | C | B | A | C |
| | 800 ± 20 | A | A | A | A | A | B |
| | 850 ± 20 | A | A | A | A | A | B |
| | 900 ± 5 | A | A | A | A | A | A |
| | All light | B | A | B | A | A | C |

As seen from the above results, the optical filters of Examples 3-3, 3-5, 3-11, and 3-12 were free of a light passage in a wavelength of 700 to 900 nm even at high incident angles and showed large transmittance values in a visible range. Furthermore, occurrence of flare and/or ghost was suppressed.

The optical filters of Examples 3-1, 3-2, 3-4, and 3-7 to 3-10 were low in light blocking ability in a wavelength of 700 to 760 nm.

The optical filter of Example 3-6 was low in visible light transmittance.

The optical filter of Example 3-13 was low in light blocking ability in a wavelength of 700 to 900 nm. Furthermore, light passage occurred in a wavelength of 760 to 900 nm at a large incident angle of 70° and flare and/or ghost were found.

Although the present invention has been described in detail with reference to the particular embodiment, it is apparent to those skilled in the art that various changes and modifications can be made without departing from the spirit and scope of the present invention. The present application is based on Japanese Patent Application No. 2020-176883 filed on Oct. 21, 2020, the disclosure of which is incorporated herein by reference.

INDUSTRIAL APPLICABILITY

The optical filter according to the present invention is high in the transparency for visible light, and exhibits a good near-infrared light blocking property in which the reduction of near-infrared light blocking ability at large incident angles is suppressed. The optical filter according to the present invention is useful for, for example, information acquisition devices such as cameras and sensors for transport machines that have been being increased in performance in recent years.

REFERENCE SIGNS LIST 1A, 1B, 1C, 1D . . . Optical filter
10 . . . Substrate
11 . . . Support body
12 . . . Resin film
30 . . . Dielectric multilayer film.

What is claimed is:

1. An optical filter comprising:
a substrate; and
a dielectric multilayer film laid on or above at least one major surface of the substrate as an outermost layer, wherein
the substrate comprises a resin film comprising a dye (IR) and a resin,
the dye (IR) has a maximum absorption wavelength in a wavelength of 680 to 800 nm in the resin, and
the optical filter satisfies all of the following spectroscopic characteristics (i-1) to (i-23):
spectroscopic characteristics (i-1) to (i-9) in a spectral transmittance curve at an incident angle of 0°:
  (i-1) an average transmittance $T_{440-490(0deg)AVE}$ in a wavelength of 440 to 490 nm is 85% or higher;
  (i-2) an average transmittance $T_{490-560(0deg)AVE}$ in a wavelength of 490 to 560 nm is 90% or higher;
  (i-3) an average transmittance $T_{560-590(0deg)AVE}$ in a wavelength of 560 to 590 nm is 83% or higher;
  (i-4) a wavelength $IR50_{(0deg)}$ at which a transmittance is 50% is in a wavelength of 600 to 680 nm;
  (i-5) a maximum transmittance $T_{700-760(0deg)MAX}$ in a wavelength of 700 to 760 nm is 2% or lower;
  (i-6) a transmittance $T_{750(0deg)}$ at a wavelength of 750 nm is 0.5% or lower;
  (i-7) a maximum transmittance $T_{760-800(0deg)MAX}$ in a wavelength of 760 to 800 nm is 1% or lower;
  (i-8) a maximum transmittance $T_{800-900(0deg)MAX}$ in a wavelength of 800 to 900 nm is 1% or lower; and
  (i-9) a maximum transmittance $T_{900-1100(0deg)MAX}$ in a wavelength of 900 to 1,100 nm is 1% or lower;
spectroscopic characteristics (i-10) to (i-18) in a spectral transmittance curve at an incident angle of 30°:
  (i-10) an average transmittance $T_{440-490(30deg)AVE}$ in the wavelength of 440 to 490 nm is 84% or higher;
  (i-11) an average transmittance $T_{490-560(30deg)AVE}$ in the wavelength of 490 to 560 nm is 90% or higher;
  (i-12) an average transmittance $T_{560-590(30deg)AVE}$ in the wavelength of 560 to 590 nm is 83% or higher;
  (i-13) a wavelength $IR50_{(30deg)}$ at which a transmittance is 50% is in the wavelength of 600 to 680 nm;
  (i-14) a maximum transmittance $T_{700-760(30deg)MAX}$ in the wavelength of 700 to 760 nm is 2% or lower;
  (i-15) a transmittance $T_{750(30deg)}$ at the wavelength of 750 nm is 0.5% or lower;
  (i-16) a maximum transmittance $T_{760-800(30deg)MAX}$ in the wavelength of 760 to 800 nm is 1% or lower;
  (i-17) a maximum transmittance $T_{800-900(30deg)MAX}$ in the wavelength of 800 to 900 nm is 1% or lower; and
  (i-18) a maximum transmittance $T_{900-1100(30deg)MAX}$ in the wavelength of 900 to 1,100 nm is 5% or lower;
  (i-19) an absolute value of a difference between the wavelength $IR50_{(0deg)}$ and the wavelength $IR50_{(30deg)}$ is 8 nm or smaller; and
spectroscopic characteristics (i-20) to (i-23) in a spectral transmittance curve at an incident angle of 70°:
  (i-20) a maximum transmittance $T_{700-760(70deg)MAX}$ in the wavelength of 700 to 760 nm is 1.5% or lower;
  (i-21) a transmittance $T_{750(70deg)}$ at the wavelength of 750 nm is 1.5% or lower;
  (i-22) a maximum transmittance $T_{760-800(70deg)MAX}$ in the wavelength of 760 to 800 nm is 1.5% or lower; and
  (i-23) a maximum transmittance $T_{800-900(70deg)MAX}$ in the wavelength of 800 to 900 nm is 1.5% or lower.

2. The optical filter according to claim 1, wherein the resin film further comprises a dye (U) having a maximum absorption wavelength in a wavelength of 370 to 430 nm in the resin, and
the optical filter further satisfies the following spectroscopic characteristic (i-24):
  (i-24) an absolute value of a difference between $UV50_{(0deg)}$ and $UV50_{(30deg)}$ is 5 nm or smaller, where the $UV50_{(0deg)}$ is a wavelength at which a transmittance in a spectral transmittance curve in a wavelength of 400 to 440 nm at the incident angle of 0° is 50% and the $UV50_{(30deg)}$ is a wavelength at which a transmittance in a spectral transmittance curve in the wavelength of 400 to 440 nm at the incident angle of 30° is 50%.

3. The optical filter according to claim 2, wherein the dye (U) comprises a merocyanine dye.

4. The optical filter according to claim 1, wherein the resin film satisfies all of the following spectroscopic characteristics (ii-1) to (ii-4):
  (ii-1) an average internal transmittance $T_{440-490\ AVE}$ in a spectral transmittance curve in the wavelength of 440 to 490 nm is 84% or higher;
  (ii-2) an average internal transmittance $T_{490-560\ AVE}$ in the spectral transmittance curve in the wavelength of 490 to 560 nm is 94% or higher;
  (ii-3) an average internal transmittance $T_{560-590\ AVE}$ in the spectral transmittance curve in the wavelength of 560 to 590 nm is 80% or higher; and
  (ii-4) a maximum internal transmittance $T_{700-760\ MAX}$ in the spectral transmittance curve in the wavelength of 700 to 760 nm is 5% or lower.

5. The optical filter according to claim 1, wherein the resin film further satisfies the following spectroscopic characteristic (ii-5):
  (ii-5) a maximum internal transmittance $T_{760-800MAX}$ in a spectral transmittance curve in the wavelength of 760 to 800 nm is 15% or lower.

6. The optical filter according to claim 1, wherein in a spectral transmittance curve of a coating film formed by dissolving the dye (IR) in the resin so that a transmittance at a maximum absorption wavelength becomes 10% to obtain a solution and applying the solution to an alkali glass plate, the dye (IR) satisfies all of the following spectroscopic characteristics (iii-1) to (iii-3):

(iii-1) an average internal transmittance $T_{440-490 AVE}$ in the spectral transmittance curve in the wavelength of 440 to 490 nm is 94% or higher;

(iii-2) an average internal transmittance $T_{490-560 AVE}$ in the spectral transmittance curve in the wavelength of 490 to 560 nm is 94% or higher; and (iii-3) an average internal transmittance $T_{560-590 AVE}$ in the spectral transmittance curve in the wavelength of 560 to 590 nm is 94% or higher.

7. The optical filter according to claim 1, wherein the dye (IR) comprises three or more compounds each having a maximum absorption wavelength in a wavelength of 680 to 800 nm in the resin.

8. The optical filter according to claim 1, wherein the dye (IR) comprises:
one or more compounds (A) each having a maximum absorption wavelength in a wavelength of 680 nm or longer and shorter than 720 nm in the resin;
one or more compounds (B) each having a maximum absorption wavelength in a wavelength of 720 nm or longer and shorter than 740 nm in the resin; and
one or more compounds (C) each having a maximum absorption wavelength in a wavelength of 740 nm or longer and 780 nm or shorter in the resin.

9. The optical filter according to claim 1, wherein the dye (IR) is selected from a squarylium dye or a cyanine dye.

10. The optical filter according to claim 1, wherein the dielectric multilayer film satisfies all of the following spectroscopic characteristics (iv-1) to (iv-12):

spectroscopic characteristics (iv-1) to (iv-6) in a spectral transmittance curve at the incident angle of 0°:
(iv-1) an average transmittance $T_{440-490(0deg)AVE}$ in the wavelength of 440 to 490 nm is 90% or higher;
(iv-2) an average transmittance $T_{490-560(0deg)AVE}$ in the wavelength of 490 to 560 nm is 90% or higher;
(iv-3) an average transmittance $T_{560-590(0deg)AVE}$ in the wavelength of 560 to 590 nm is 90% or higher;
(iv-4) a shortest wavelength $IR50_{(0deg)}$ at which a transmittance is 50% in a wavelength of 600 nm or longer is in a wavelength of 630 to 730 nm;
(iv-5) a maximum transmittance $T_{700-760(0deg)MAX}$ in the wavelength of 700 to 760 nm is 25% or higher; and
(iv-6) a maximum transmittance $T_{760-900(0deg)MAX}$ in the wavelength of 760 to 900 nm is 2% or lower; and spectroscopic characteristics (iv-7) to (iv-12) in a spectral transmittance curve at the incident angle of 30°:
(iv-7) an average transmittance $T_{440-490(30deg)AVE}$ in the wavelength of 440 to 490 nm is 90% or higher;
(iv-8) an average transmittance $T_{490-560(30deg)AVE}$ in the wavelength of 490 to 560 nm is 90% or higher;
(iv-9) an average transmittance $T_{560-590(30deg)AVE}$ in the wavelength of 560 to 590 nm is 90% or higher;
(iv-10) a shortest wavelength $IR50_{(30deg)}$ at which a transmittance is 50% in a wavelength of 600 nm or longer is in the wavelength of 630 to 730 nm;
(iv-11) a maximum transmittance $T_{700-760(30deg)MAX}$ in the wavelength of 700 to 760 nm is 25% or higher; and
(iv-12) a maximum transmittance $T_{760-900(30deg)MAX}$ in the wavelength of 760 to 900 nm is 2% or lower.

11. The optical filter according to claim 1, wherein the substrate comprises a support body and the resin film,
the resin film is laid on at least one major surface of the support body, and
the support body comprises a phosphate glass or a fluorophosphate glass.

12. The optical filter according to claim 1, wherein the resin is a transparent resin.

13. The optical filter according to claim 1, wherein the resin is a polyimide resin.

* * * * *